US009336466B2

(12) United States Patent
Kishimoto et al.

(10) Patent No.: US 9,336,466 B2
(45) Date of Patent: May 10, 2016

(54) PRINTING APPARATUS INCLUDING A MOVING GUIDING PORTION

(71) Applicant: FUJI XEROX CO., LTD., Tokyo (JP)

(72) Inventors: Teruki Kishimoto, Ebina (JP); Yoshiyuki Taguchi, Ebina (JP); Shun Ikegami, Ebina (JP); Masafumi Kudo, Ashigarakami-gun (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/614,851

(22) Filed: Feb. 5, 2015

(65) Prior Publication Data

US 2016/0070996 A1 Mar. 10, 2016

(30) Foreign Application Priority Data

Sep. 8, 2014 (JP) ................................ 2014-181944
Sep. 8, 2014 (JP) ................................ 2014-181945
Sep. 8, 2014 (JP) ................................ 2014-181946
Sep. 8, 2014 (JP) ................................ 2014-181947

(51) Int. Cl.
*G06K 15/00* (2006.01)
*G06K 15/16* (2006.01)
*G06F 3/12* (2006.01)

(52) U.S. Cl.
CPC .................................... *G06K 15/16* (2013.01)

(58) Field of Classification Search
CPC ...... G06K 15/16; B41J 11/007; B65H 45/223
USPC .................... 358/1.1, 1.8, 1.12, 1.15; 347/19; 271/225
See application file for complete search history.

(56) References Cited

U.S. PATENT DOCUMENTS 5,104,022 A * 4/1992 Nakamura ............. B65H 35/10 225/100
5,358,346 A * 10/1994 Schmidt ................ G06K 15/16 226/196.1
5,947,411 A 9/1999 Burke et al.
2011/0221124 A1* 9/2011 Narikiyo .................. B65H 5/38 271/225

FOREIGN PATENT DOCUMENTS

JP H04-049075 A 2/1992
JP H04-141465 A 5/1992
JP H05-124276 A 5/1993
JP H08-174853 A 7/1996
JP H09-226147 A 9/1997
JP H11-314837 A 11/1999
JP 2003-080720 A 3/2003
JP 2006-021851 A 1/2006
JP 2006-182458 A 7/2006
JP 2008-290789 A 12/2008

* cited by examiner

*Primary Examiner* — Gabriel Garcia
(74) *Attorney, Agent, or Firm* — Oliff PLC

(57) ABSTRACT

A printing apparatus includes: a first driving portion transporting a paper sheet; a printing portion being disposed on an upstream side of the first driving portion in a transporting direction of the transported paper sheet, including a plurality of aligned ejection ports ejecting liquid onto the transporting paper sheet to print an image on the paper sheet by the liquid; a drawing portion being disposed on an upstream side of the printing portion in the transporting direction, drawing the paper sheet of which a tip end is placed at a preset position, and feeding the paper sheet to a transporting path via the printing portion and the first driving portion; and a guiding portion being interposed between the printing portion and the first driving portion in the transporting direction, and when feeding the paper sheet, freely reciprocating between a first position and a second position.

4 Claims, 18 Drawing Sheets

PRINTING APPARATUS INCLUDING A MOVING GUIDING PORTION

CROSS-REFERENCE TO RELATED APPLICATIONS

This application is based on and claims priority under 35 USC 119 from Japanese Patent Application No. 2014-181944 filed on Sep. 8, 2014, Japanese Patent Application No. 2014-181945 filed on Sep. 8, 2014, Japanese Patent Application No. 2014-181946 filed on Sep. 8, 2014, and Japanese Patent Application No. 2014-181947 filed on Sep. 8, 2014.

BACKGROUND

Technical Field

The present invention relates to a printing apparatus, a paper transporting device, and a printing Machine Maintenance device.

SUMMARY

An aspect of the present invention provides a printing apparatus including: a first driving portion that transports a paper sheet by driving; a printing portion that is disposed on an upstream side of the first driving portion in a transporting direction of the paper sheet which is transported b the first driving portion, includes a plurality of aligned ejection ports ejecting liquid onto the transporting paper sheet to print an image on the paper sheet by the liquid; a drawing portion that is disposed on an upstream side of the printing portion in the transporting direction, draws the paper sheet of which a tip end is placed at a preset position, and feeds the paper sheet to a transporting path via the printing portion and the first dining portion; and a guiding portion that is interposed between the printing portion and the first driving portion in the transporting direction, and when feeding the paper sheet, freely reciprocates between a first position and a second position which is apart from the first position in a first direction, in which the guide portion guides a part passing through the printing portion in the paper sheet to the first driving portion in a state where the guide portion is in the first position, and the guide portion makes the part passing through the printing portion in the paper sheet detour in the first direction and guides the part to the first driving portion in a state where the guide portion moves to the second portion.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiment(s) of the present invention will be described.

(Description of the Entire Apparatus)

Figure 1:
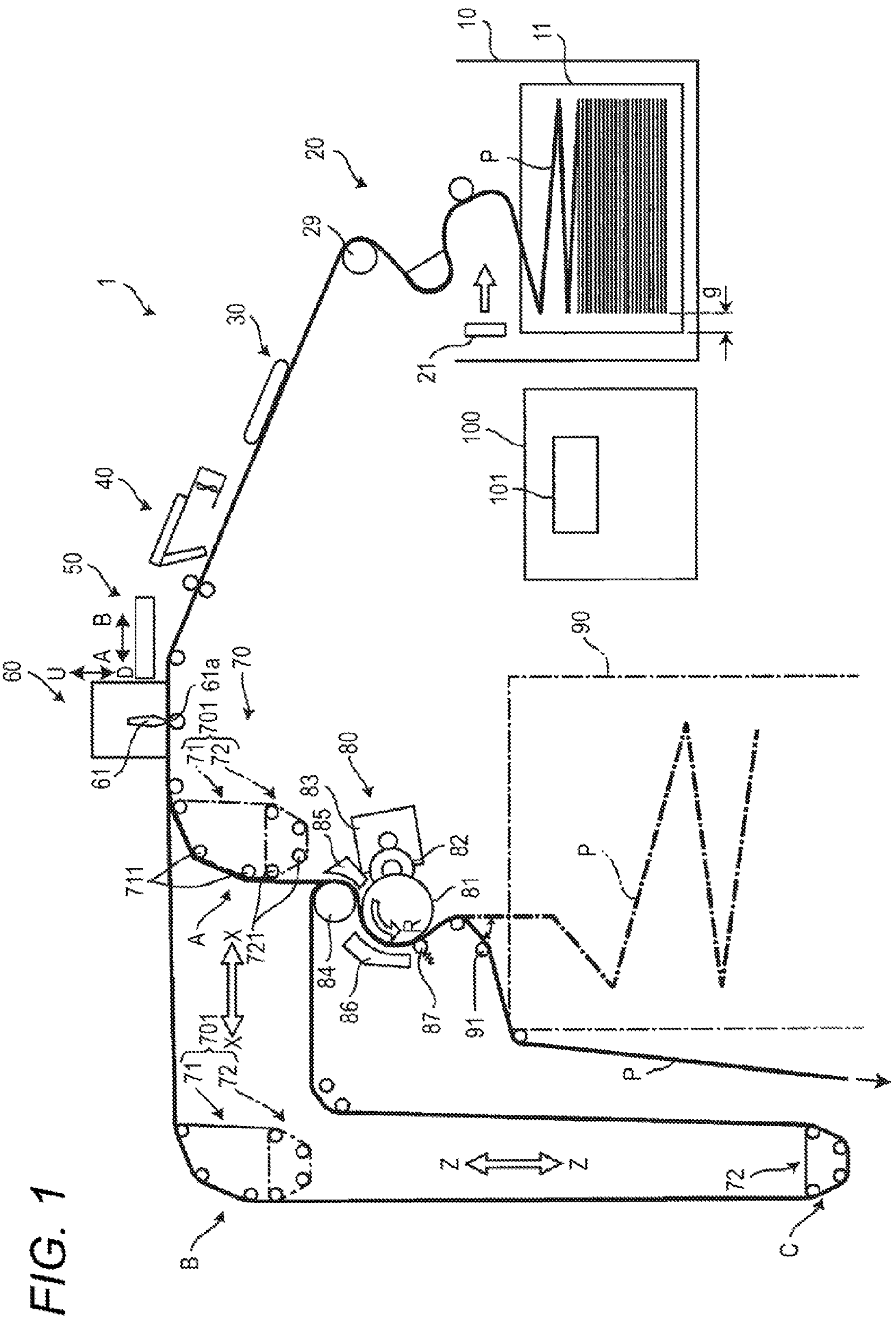
FIG. 1 is a schematic diagram of a printing apparatus as one embodiment of the present invention.

FIG. 1 is a schematic view of a printing apparatus as one embodiment of the present invention.

A printing apparatus 1 is a printing apparatus which pulls out and transports a continuous business form paper sheet that is folded and stored in a storage box 11 placed in a paper storage portion 10, that is, a so-called continuous form paper sheet P, and which prints an image on the continuous form paper sheet P.

Figure 2:
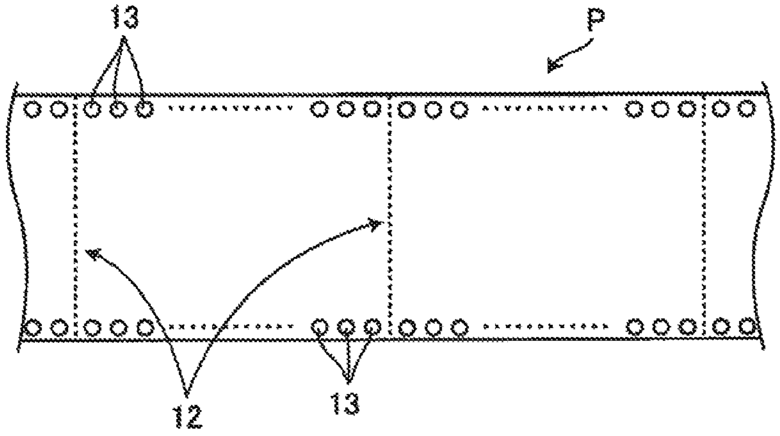
FIG. 2 is a schematic diagram illustrating an example of a continuous form paper sheet which is used in the embodiment.

FIG. 2 is a schematic view illustrating an example of the continuous form paper sheet which is used in the embodiment.

Perforations 12 are formed on the continuous form paper sheet P with a certain interval. In addition, in both end portions of the continuous form paper sheet P in a width direction, sprocket holes 13 are formed to be aligned in a longitudinal direction with a certain pitch. The continuous form paper sheet P is folded every perforation 12 by considering the perforation 12 as a fold, and is stored in the storage box 11 as illustrated in FIG. 1. Then, the continuous form paper sheet P, which is stored in the storage box 11, is pulled out from the storage box 11 and is transported.

The description continues with reference to FIG. 1 again.

A tractor 30 and a driving device 80 have, a function of transporting the continuous form paper sheet P. The tractor 30 corresponds to an example of a drawing portion and an example of a sending device, and the driving device 80 corresponds to an example of a first driving portion and an example of a transporting portions.

The tractor 30 is provided with projections not illustrated) which are fitted in the sprocket holes 13 (refer to FIG. 2) formed in both end portions of the continuous form paper sheet P in the width direction, and is a device having a structure in which the continuous form paper sheet P is sent by the projection.

If a tip end portion of the continuous form paper sheet P is manually pulled out from the storage box 11 and the continuous form paper sheet P is fed up to the tractor 30 along a necessary paper feeding path, then, the continuous form paper sheet P is sent by the tractor 30, and is automatically fed via the necessary paper feeding path. At this time, a guiding portion 701 which constitutes a guiding device 70 is at a first position A which is close to a printing machine 60 and the driving device 80, and guides the tip end portion of the continuous form paper sheet P which keeps being fed. The guiding device 70 and the guiding portion 701 will be described in detail later. The continuous form paper sheet P which passes through the driving device 80 is folded and accommodated in a paper accommodation portion 90 along the paper feeding path which is switched by a paper feeding switching mechanism 91 in advance, or is transported toward a post-processing device (not illustrated) which is provided at a rear end of the printing apparatus 1. In addition, a tip end of the continuous form paper sheet P is manually delivered to the post-processing device from the printing apparatus 1. In addition, in the printing, apparatus 1, a control device 100 which has a function of controlling the entire printing apparatus 1 is provided. In the control device 100, a user interface (UI) 101 for notifying a user of a state in the printing apparatus 1 or giving a command of the user to the printing apparatus 1, is provided.

The continuous form paper sheet P which is pulled out from the storage box 11 is via a paper pulling stabilizing device 20 which is provided with a fan 22, is given a back tension by a back tension roll 29, is via the above-described tractor 30, and further, reaches the driving device 80 through a paper path via a paper powder removing device 40, a printing machine maintenance device 50 which is at a retreating position, the printing machine 60, and the guiding device 70. As described above, the continuous form paper sheet P, which is further sent out by the driving device 80, is accommodated in the paper accommodation portion 90 along the paper feeding path which is switched by the paper feeding switching mechanism 91, or is sent out from the printing apparatus 1.

(Driving Device)

Hereinafter, first, the driving device 80 will be described.

A driving roll 81 is provided in the driving device 80. The driving roll 81 receives a driving force of a motor 83 which is transferred via a relay gear 82, and is driven to rotate in an arrow R direction.

The tip end portion of the continuous form paper sheet P which is sent by the tractor 30 and is guided by the guiding device, passes between a guiding roll 84 and a guiding member 85 which faces the guiding roll and reaches the driving roll 81. Then, the continuous form paper sheet P is guided to a guiding member 86 which faces the driving roll 81 and advances by being wound around the driving roll 81, and then, is pressed against the driving roll 81 by a spring-biased pressing roll 87. After this, as described above, the continuous form paper sheet P advances toward the paper accommodation portion 90, or is sent out from the printing apparatus 1.

(Printing Machine)

Next, the printing machine 60 will be described. The printing machine 60 is an example of a printing portion and an example of the printing machine.

The printing machine 60 is a so-called ink jet type printing machine, and plural nozzles 61 which eject ink toward the continuous form paper sheet P from ejection ports 61*a* are aligned in the width direction of the continuous form paper sheet R When the image is printed on the continuous form paper sheet P, the printing machine 60 moves in an arrow D direction and is at a printing position illustrated in FIG. 1. When the printing is paused, the printing machine 60 is raised in an arrow U direction and is at a waiting position. In addition, the printing machine maintenance device 50 moves in an arrow B direction when printing is performed, and is at the retreating position illustrated in FIG. 1. When the printing is paused, the printing machine maintenance device 50 moves in an arrow A direction, and is disposed right below the printing machine 60 which is raised in an arrow U direction and at the waiting position. The printing machine maintenance device 50 will be described in detail later.

(Guiding Device)

Hereinafter, the guiding device 70 will be described. In the guiding, device 70, the guiding portion 701 is provided. The guiding portions 701 includes a first guiding portion 71 and a second guiding portion 72 which are respectively provided with a plurality of rolls 711 and 721.

The guiding portion 701 is configured to be interposed between the printing machine 60 and the driving device 80 in a transporting direction of the continuous form paper sheet P, and to freely reciprocate in a horizontal direction (arrow X-X direction) between a first position A and a second position B. When the continuous form paper sheet P is fed, and when the printing is paused, the first position A is a position at which the guiding portion 701 is moved and placed. The guiding portion 701 which is at the first position A guides the tip end portion of the continuous form paper sheet P which passes through the printing machine 60 to the driving device 80. When moving between the first position A and the second position B, the first guiding portion 71 and the second guiding portion 72 move as one body. When the guiding portion 701 is at the second position B, the guiding portion 701 makes a part which passes through the printing machine 60 in the continuous form paper sheet P detour up to the second position B in a horizontal direction (arrow X-X direction), and guides the part to the driving device 80.

In addition, in the embodiment, the second guiding portion 72 is configured to be separated from the first guiding portion 71 and freely move, between the second position B and a third position C which descends from the second position B in a perpendicular direction (arrow Z-Z direction).

In other words, in a state where the second guiding portion 72 moves to the third position C, the guiding portion 701 makes a part which passes through the printing machine 60 in the continuous form paper sheet P detour in the horizontal direction (arrow X-X direction) by the first guiding portion 71, further makes the part detour up to the third position C in the perpendicular direction (arrow Z-Z direction) by the second guiding portion 72, and guides the part to the driving device 80. The horizontal direction (arrow X-X direction) is an example of the first direction, and the perpendicular direction (arrow Z-Z direction) is an example of the second direction.

Since the printing machine 60 performs printing on the continuous form paper sheet P using the ink which is the liquid, it is necessary to take some time to dry the printing. Here, in the printing apparatus 1 of the embodiment, when printing is performed on the continuous form paper sheet P, a large detour is made in order to ensure time for drying the ink.

Figure 3:
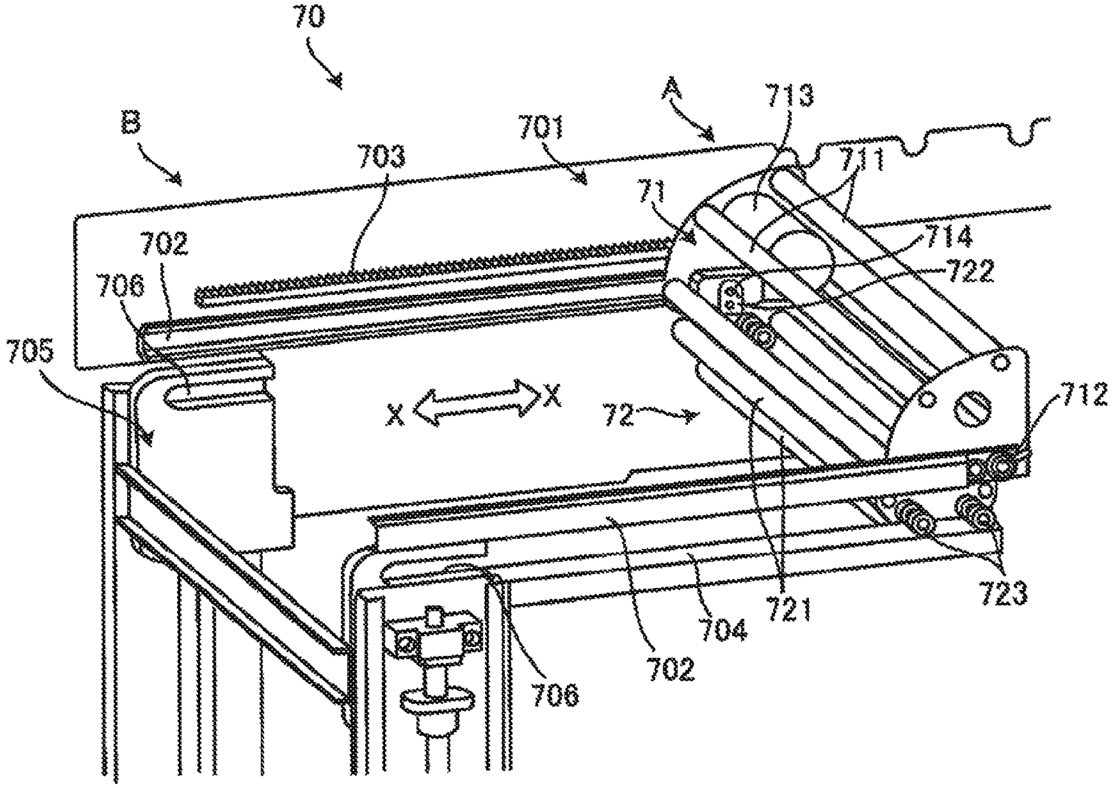
FIG. 3 is a view illustrating a schematic structure and operations of a guiding device.
Figure 4:
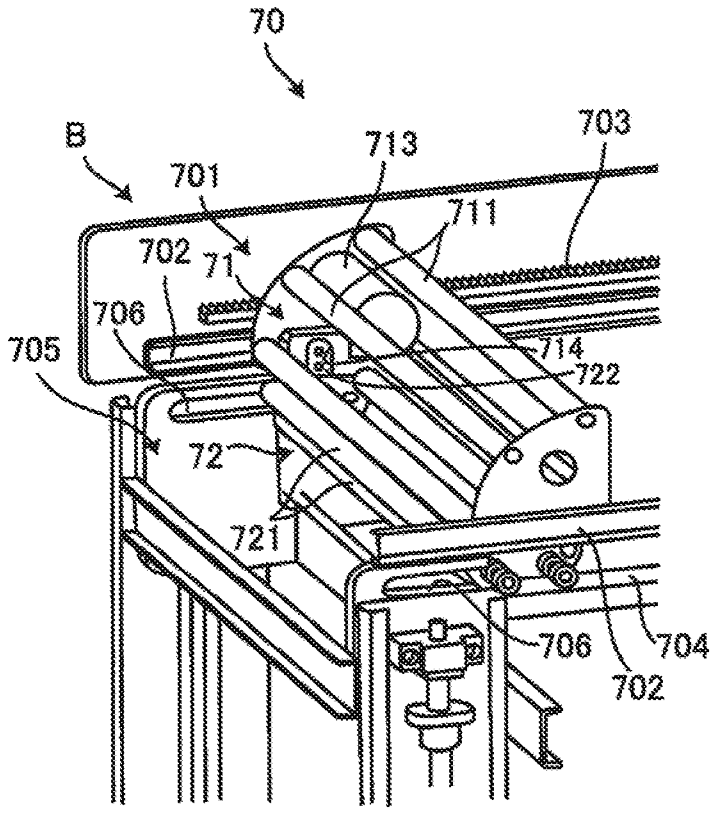
FIG. 4 is a view illustrating a schematic structure and operations of the guiding device.
Figure 5:
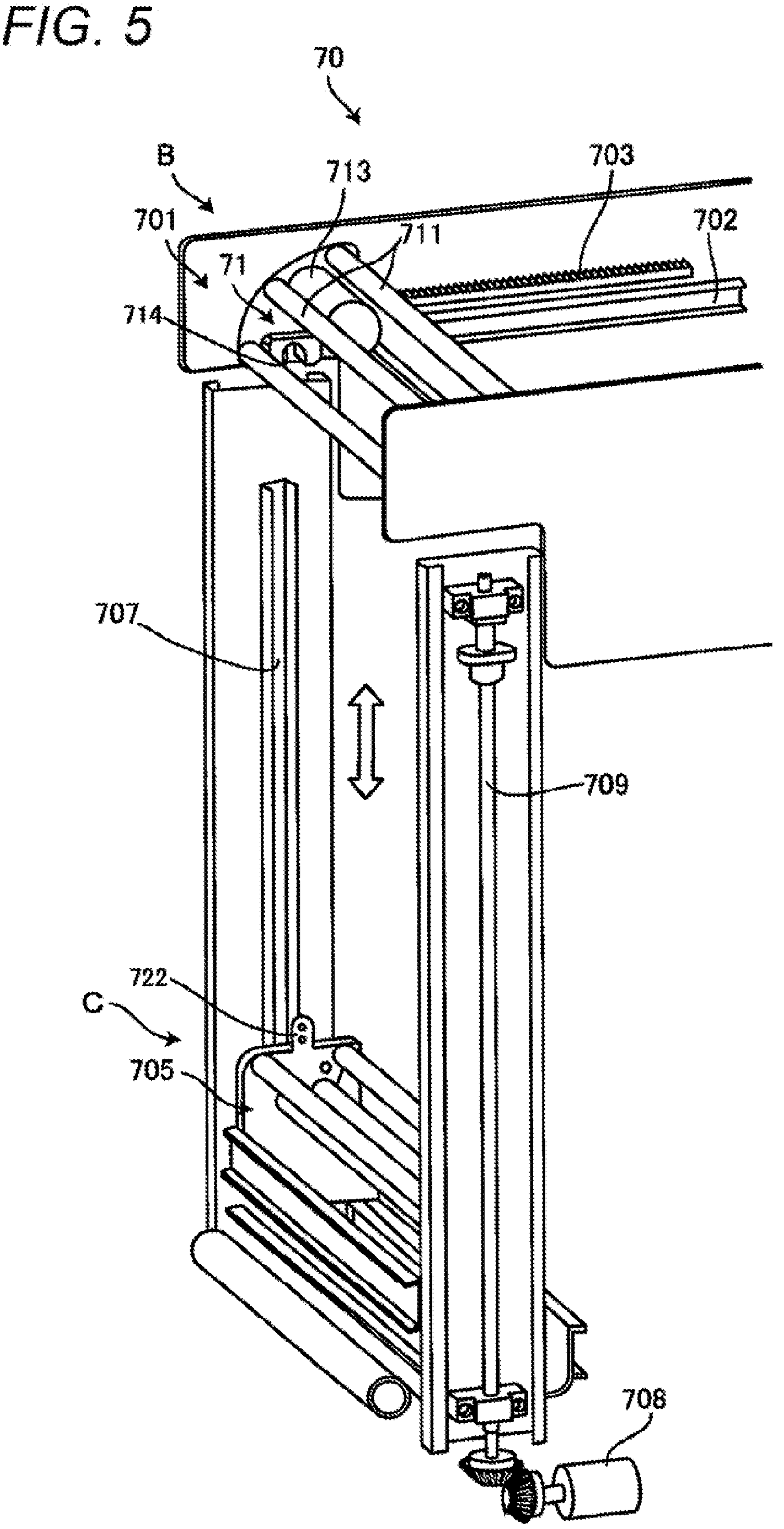
FIG. 5 is a view illustrating a schematic structure and operations of the guiding device.

FIGS. 3 to 5 are views illustrating a schematic structure and operations of the guiding device.

Here, FIG. 3 illustrates a state where the guiding portion 701 which constitutes the guiding device 70 is at the first position A. In addition, FIG. 4 illustrates a state where the guiding portion 701 moves from the first position A and is close to the second position B. Furthermore, FIG. 5 illustrates a state where the second guiding portion 72 which constitutes the guiding portion 701 is separated from the first guiding portion 71 and moves to the third position C.

As described above, the guiding portion 701 includes the first guiding portion 71 and the second guiding portion 72. The guiding device 70 includes a pair of guiding frames 702 which extends in the horizontal direction (arrow X-X direction) and guides the guiding portion 701 in the horizontal direction (arrow X-X direction), and a rack 703 which extends in the horizontal direction (arrow X-X direction) in the same manner.

In contrast, the first guiding portion 71 which constitutes the guiding portion 701 includes a guiding roller 712 and a motor 713.

The guiding roller 712 is a member which is fitted in the guiding frame 702 and is guided to the guiding frame 702. In addition, in the motor 713, a pinion gear (not illustrated) which is engaged with the rack 703 is fixed to a rotation axis of the motor 713. Accordingly, when the motor 713 rotates, first, the first guiding portion 71 is guided to the guiding frame 702 and moves in the horizontal direction (arrow X-X direction).

In addition, in the first guiding portion 71, a combination concave portion 714 (refer to FIG. 5 together), which is combined with the second guiding portion 72 and is open downwardly, is provided. According to this, in the second guiding portion 72, a combination convex portion 722, which is fitted in the combination concave portion 714 from the below, is provided. As the first guiding portion 71 moves in the horizontal direction (arrow X-X direction) in a state where the combination convex portion 722 is fitted in the combination concave portion 714, the second guiding portion 72 also moves in the horizontal direction (arrow X-X direction) as one body with the first guiding, portion 71. A guiding, roller 723 is provided in the second guiding portion 72, and when moving in the horizontal direction (arrow X-X direction), the guiding roller 723 is guided to a guiding bar 704 which horizontally extends.

At the second position B, a lift mechanism 705 which moves the second guiding portion 72 in the perpendicular direction (arrow Z-Z direction illustrated in FIG. 5) stands by. In the lift mechanism 705, a groove 706 into which the guiding roller 723 of the second guiding portion 72 enter is provided when the guiding portion 701 moves to the second position B. In addition, in the guiding device 70, a screw axis 709, which vertically extends between the second position B and the third position C, and which is driven to rotate by a motor 708, is provided. By the rotation of the screw axis 709, the lift mechanism 705 is separated from the first guiding portion 71 and moves in the perpendicular direction (arrow Z-Z direction), while being guided to a guiding pole 707 which vertically extends.

Figure 6:
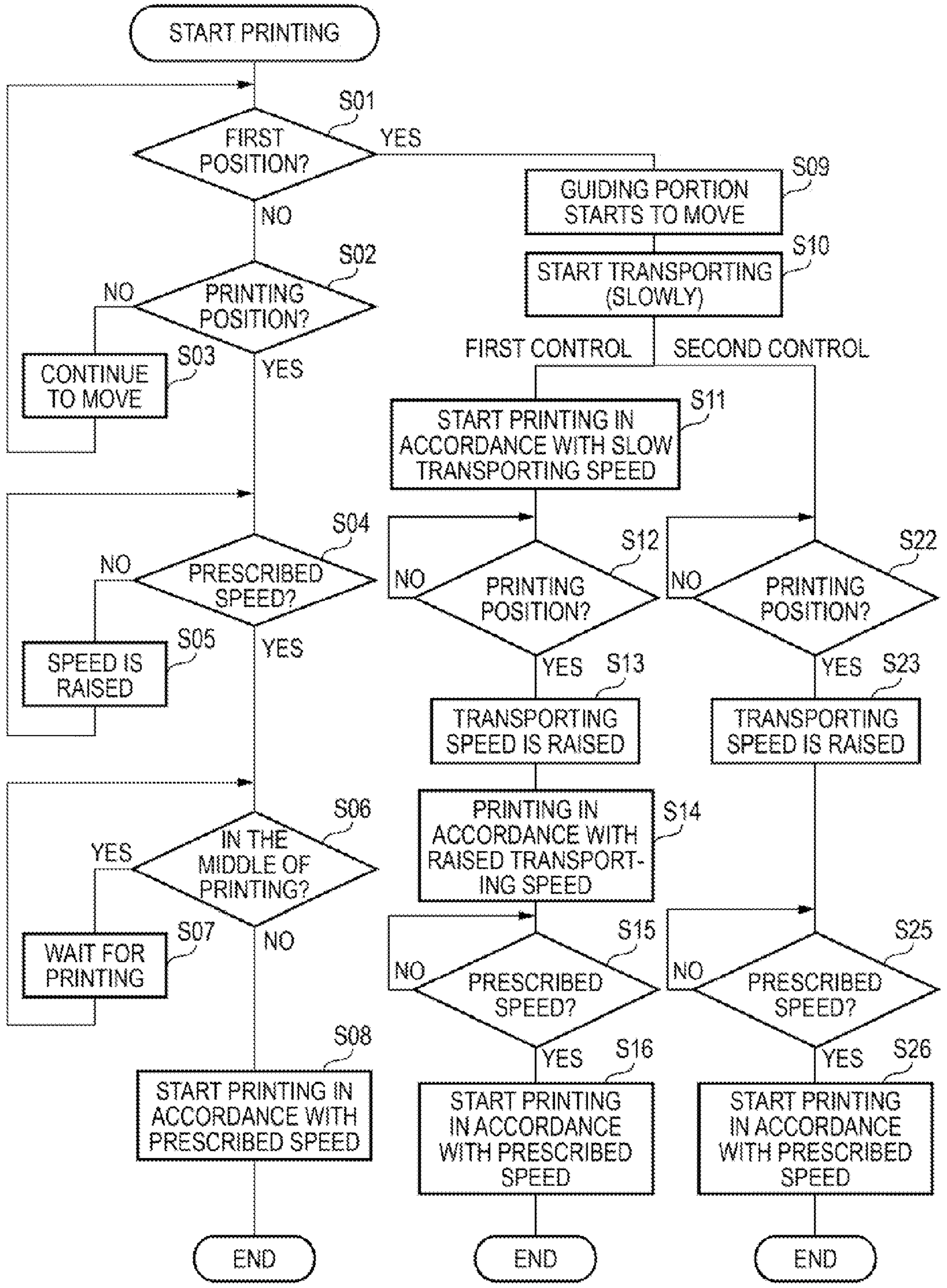
FIG. 6 is a flow chart illustrating an operation sequence when printing is performed.

FIG. 6 is a flow chart illustrating an operation sequence when printing is performed.

One of a first control and a second control in the flow chart is selected in advance by an operation of an UI 101 (refer to FIG. 1) by the user. Printing is started by a printing start command as image data for printing is sent from an image editing device, which is not illustrated, to the printing apparatus 1. In this case, the operations are performed in accordance with the operation sequence illustrated in FIG. 6.

When the printing apparatus 1 pauses printing, the first guiding portion 71 returns to the first position A and stands by. Meanwhile, the guiding portion 701 moves to the printing position while printing is performed, and stops at the printing position. Here, in the embodiment, in general, a case where the first guiding portion 71 is at the second position B, and the second guiding portion 72 is at the third position C, is referred to as a case where the guiding portion 701 is at the printing position. However, in a state where the printing apparatus 1 uses quick-drying ink, and the guiding portion 701 (both the first guiding portion 71 and the second guiding portion 72) is at the second position B, that is, when drying is sufficiently performed only by making the continuous form paper sheet P detour up to the second position B in the horizontal direction, a case where the guiding portion 701 including the second guiding, portion 72 is at the second position B may be a case where the guiding portion 701 is at the printing position.

When the printing start command is received, first, it is determined whether or not the guiding portion 701 is at the first position A (step S01). A state where the guiding portion 701 is at the first position A means a state where printing is paused. Operations in a state where the guiding portion 701 is at the first position A, will be described later.

When it is determined that the guiding portion 701 is not at the first position A (step S01), then, it is determined, whether or not the guiding portion 701 is at the printing position (step S02). When the guiding portion 701 is not at the first position A and not at the printing position, the guiding portion 701 is in the middle of movement between the first position A and the printing position, and the movement continues (step S03).

When it is confirmed that the guiding portion 701 is at the printing position (step S02), it is determined whether the transporting speed of the continuous form paper sheet P is a prescribed transporting speed or the transporting speed is in the middle of increase at this moment, (step S04). When the transporting speed is in the middle of increase, until the transporting speed reaches the prescribed transporting speed, a state where the speed increases is maintained (step S05).

When it is determined that the transporting speed of the continuous form paper sheet P is the prescribed speed (step S05), then, it is determined whether or not printing which is commanded before the current printing command is in the middle of being performed (step S06). When printing is in the middle of being performed, the current printing command is in a state of waiting printing, and printing is started after the previous priming ends.

In the step S06, when it is determined that printing is not in the middle of being performed, printing is started at a speed in accordance with the prescribed transporting speed.

Next, operations when it is determined that the guiding portion 701 exists at the first position A in the step S01, will be described.

In the step S01, when it is recognized that the guiding portion 701 exists at the first position A, the guiding portion 701 starts to move toward the printing position (step S09), and according to this, the continuous form paper sheet P starts to be slowly transported (step S10).

After this, the operation sequence varies depending on the control set in advance by the user of the first control and the second control.

In a case of the first control, the stand-by time until printing is started is shortened.

In a case of the first control, when the guiding portion 701 starts to move and the continuous form paper sheet P starts to be transported at a slow transporting speed, printing is started at a speed in accordance with a slow transporting speed (step S11). Then, when the guiding portion 701 reaches the printing position (step S12), the transporting speed of the continuous form paper sheet P increases toward the prescribed transporting speed (step S13), and printing is performed at a printing speed which is increased in accordance with the increased transporting speed, (step S14). Then, when the transporting speed of the continuous form paper sheet P reaches the prescribed transporting speed (step S15), printing is started at a printing speed in accordance with the prescribed transporting speed (step S16).

In other words, in the first control, printing is started from a starting point of the movement of the guiding portion 701 from the first position A.

Next, the second control will be described. In a case of the above-described first control, since printing is performed even when the guiding portion 701 moves and even before the transporting speed of the continuous form paper sheet P reaches the prescribed transporting speed, it is disadvantageous that ensuring a quality of printing is difficult. In contrast, in the second control described below, operations in which the quality of printing is considered important are performed.

In the second control, even when the guiding portion 701 starts to move in the step S09, and the continuous form paper sheet P starts to be transported at a slow transporting speed in the step S10, printing is not performed immediately, and stands by until the guiding portion 701 reaches the printing position (step S22). Furthermore, even when the guiding portion 701 reaches the printing position, printing is not started yet, and the transporting speed of the continuous form paper sheet P is increased (step S23). Then, when the transporting speed of the continuous form paper sheet P reaches the prescribed transporting speed (step S25), printing is started at a printing speed in accordance with the prescribed speed, (step S26).

In a case of the second control, when printing is started, the guiding portion 701 is in a state of being moved to the printing position, and the transporting speed of the continuous form paper sheet P is also stabilized to be the prescribed transporting speed. Therefore, compared to a case of the first control, printing with a stabilized high quality is performed (step S26).

In other words, in a case of the second control, the guiding portion 701 is in a state of being moved to the printing position, and the transporting speed of the continuous form paper sheet P is also stabilized to be the prescribed transporting speed. Therefore, compared to a case of the first control, printing with a stabilized high quality is expected.

(Paper Pulling Stabilizing Device)

Next, the paper pulling stabilizing device 20 illustrated in FIG. 1 will be described.

As described above, the storage box 11 is placed in the paper storage portion 10. In the storage box 11, the continuous form paper sheet P having the structure illustrated in FIG. 2 is stored to be folded every perforation. In the printing apparatus 1, the tip end portion of the continuous form paper sheet P is manually pulled out up to the position of the tractor 30 and is set at the tractor 30. After this when feeding of the paper sheet is commanded by the operation of the UI 101, the continuous form paper sheet P is automatically transported on the paper feeding path and is fed.

After the paper sheet is fed, printing is performed on the continuous form paper sheet P. However, when printing is performed, a residual amount of the continuous form paper sheet P in the storage box 11 becomes smaller. When a void g between the inner wall surface of the storage box 11 and the continuous form paper sheet P in the storage box 11 is narrow to be several mm, and the residual amount of the continuous form paper sheet P becomes smaller, if the air flow into a wedge-shaped part on a rear side of a pulled-out part of the continuous form paper sheet P is not followed, and there is no particular countermeasure, there is a case where the continuous form paper sheet P is pulled out while being adhered to the inner wall surface of the storage box 11. In this case, since the continuous form paper sheet P is folded by the perforations 12 (refer to FIG. 2), there is a concern that a relationship of the continuous form paper sheet P with the inner wall surface of the storage box at a part of the perforations 12 and at a part other than the perforations 12, changes a lot, a tension of the continuous form paper sheet P largely changes with a cycle of the perforations 12, the change in tension is transferred up to the printing machine 60, and the transfer of the tension causes deterioration of printing quality. In recent years, there is a tendency of increasing the transporting speed for high efficiency of printing. When the transporting speed is high, the influence of the change in tension is more remarkable.

Here, in the embodiment, the paper pulling stabilizing device 20 is disposed in an upper portion of the storage box 11 which is placed in the paper storage portion 10, and the continuous form paper sheet P is stably pulled out from the storage box 11.

Figure 7:
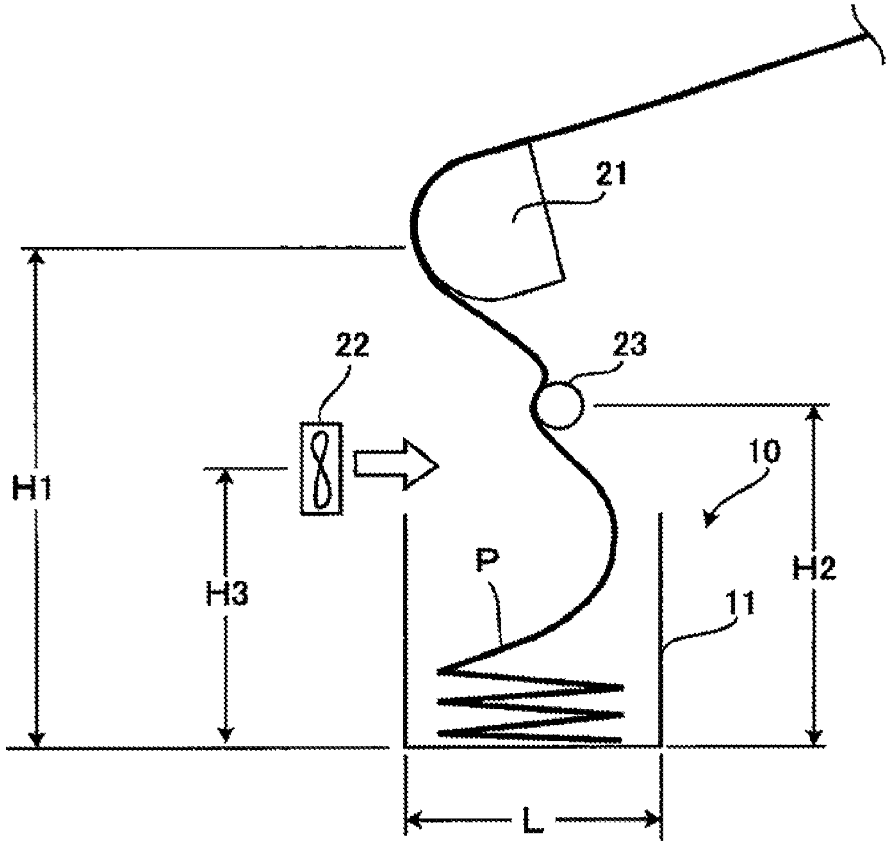
FIG. 7 is a schematic diagram of a paper pulling stabilizing device.

FIG. 7 is a schematic view of the paper pulling stabilizing, device.

Here, a guiding member 21, the fan 22, a supporting roll 23, are illustrated.

Here, the guiding member 21 is an example of a leading member. The guiding member 21 is installed at a position which is apart upwardly from the storage box 11 placed in the paper storage portion 10, and is a member which stabilizes a direction of transportation of the continuous form paper sheet P pulled out from the storage box 11.

In addition, the fan 22 is an example of an air blowing portion. The fan 22 has a function of sending out the wind in a lateral direction toward a part before the continuous form paper sheet P pulled out from the paper storage portion 10 reaches the guiding member 21.

In this manner, when the fan 22 is provided and the lateral wind hits the part which is pulled out from the storage box 11, in the continuous form paper sheet P, the continuous form paper sheet is apart from the inner wall surface of the storage box 11.

Here, if the fan 22 is installed in a direction of actively sending the wind to the void g between the inner will surface of the storage box 11 and the continuous form paper sheet P stored in the storage box 11, the continuous form paper sheet P is flapped to be a posture which cannot be controlled and becomes unstable.

In addition the supporting roll 23 is an example of the supporting member. The supporting roll 23 is in contact with a part which is laterally pushed by the wind sent out from the fan 22, and has a function of laterally supporting the part of the continuous form paper sheet P which is pulled out from the storage box 11 placed in the paper storage portion 10.

The supporting roll 23 is arranged between the fan 22 and the guiding member 21 in the vertical direction. In other words, in a relationship of installation heights, the guiding member 21 (height H1), the supporting roll 23 (height H2), and the fan 22 (height H3) are H1>H2>H3. In the embodiment, H1=750 mm, H2=450 mm, and H3=400 mm.

When the supporting roll 23 is provided, compared to a case where the wind is sent by the fan 22 without providing the supporting roll 23, the continuous form paper sheet P pulled out from the storage box 11 is unlikely to flutter. In addition, as H2>H3, that is, as the supporting roll 23 is disposed above an air blowing port of the fan 22, the accuracy of posture control of the continuous form paper sheet P is further enhanced compared to a case where the supporting roll 23 is disposed below the air blowing port (H2<H3).

Here, the supporting roll 23 is in contact with the continuous form paper sheet P, and is a rotating body which is driven by transportation of the continuous form paper sheet R However, instead of the supporting roll 23 which is the rotating body, a supporting member which is a non-rotating body, may be disposed.

As a result of making the wind hit the part, which keeps being pulled out from the storage box 11 in the continuous form paper sheet P, by the fan 22, because of the wind, when the continuous form paper sheet P comes into contact with a surface on a side apart from the fan 22 among the inner wall surfaces of the storage box 11, there is a concern that a change in tension or in transporting speed is generated by the contact at this time. Here, even when the continuous form paper sheet P is laterally pushed by the wind sent from the fan 22, an amount of wind (rotating speed of the fan 22) or the position where the supporting roll 23 is disposed is adjusted so that the continuous form paper sheet P avoids coming into contact with the inner wall surface of the storage box 11 because of the wind. The supporting roll 23 is disposed at a position of L/2=3.5 inches to be disposed at a center of a minimum paper folding length L (for example, 7 inches).

The direction of transportation of the continuous form paper sheet P which is pulled out while receiving the lateral wind from the storage box 11 is stabilized by the guiding member 21. Furthermore, the continuous form paper sheet P is via, the back tension roll 29 illustrated in FIG. 1 and is further transported to a downstream.

Figure 8:
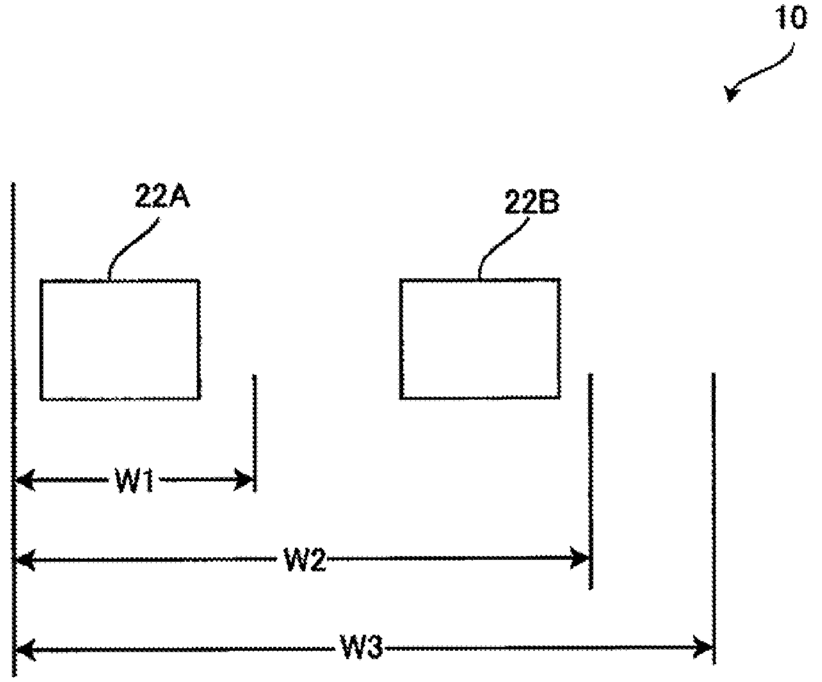
FIG. 8 is a diagram illustrating a position where a fan is disposed.

FIG. 8 is a view illustrating a position where the fan is disposed. FIG. 8 is different from FIGS. 1 and 7, and illustrates the position of the fan 22 when the paper storage portion 10 is viewed from the fan 22 side.

In the printing apparatus 1 of the embodiment, it is possible to use three types of continuous form paper sheets P, including the continuous form paper sheets P having a minimum paper width W1 (for example, 6.5 inches in width), an intermediate paper width W2 (for example, 15 inches in width), and a maximum paper width W3 (for example, 18 inches in width).

Here, in the embodiment, two fans 22A and 22B are disposed.

When the continuous form paper sheet P having the minimum paper width W1 is used, only the fan 22A which is one of the two fans 22A and 22B operates to the continuous form paper sheet P. For this reason, the amount of wind which is sent out from the fan 22A is set to be an amount of wind to an extent that the continuous form paper sheet P which keeps being pulled out from the storage box 11 that stores the continuous form paper sheet P having the minimum paper width W1 does not come into contact with the inner wall surface of the storage box which stores the continuous form paper sheet P having the minimum paper width W1.

In addition, when the continuous form paper sheet P having the intermediate paper width W2 or the maximum paper width W3 is used, both of the two fans 22A and 22B operate to the continuous form paper sheet P. For this reason, in a relationship with the amount of wind of the fan 22A, an amount of wind of the fan 22B is set on conditions that a balance of the amount of wind in a paper width direction is not lost, and the continuous form paper sheet P does not come into contact with the inner wall surface of the storage box 11 that stores the continuous form paper sheet P when the continuous form paper sheet P having the intermediate paper width W2 or the maximum paper width W3 is pulled out from the storage box 11.

(Paper Powder Removing Device)

Next, the paper powder removing device 40 will be described.

The paper powder removing device 40 is an example of a removing portion. The paper powder removing device 40 has a function of removing the paper powder which is transported by an air current which accompanies the transportation of the continuous form paper sheet P. The paper powder removing device 40 is disposed further on an upstream side than the printing machine 60 in the transporting direction of the continuous form paper sheet P, and prevents generation of an image defect by reducing an amount of paper powder which is transported to the printing machine 60.

Figure 9:
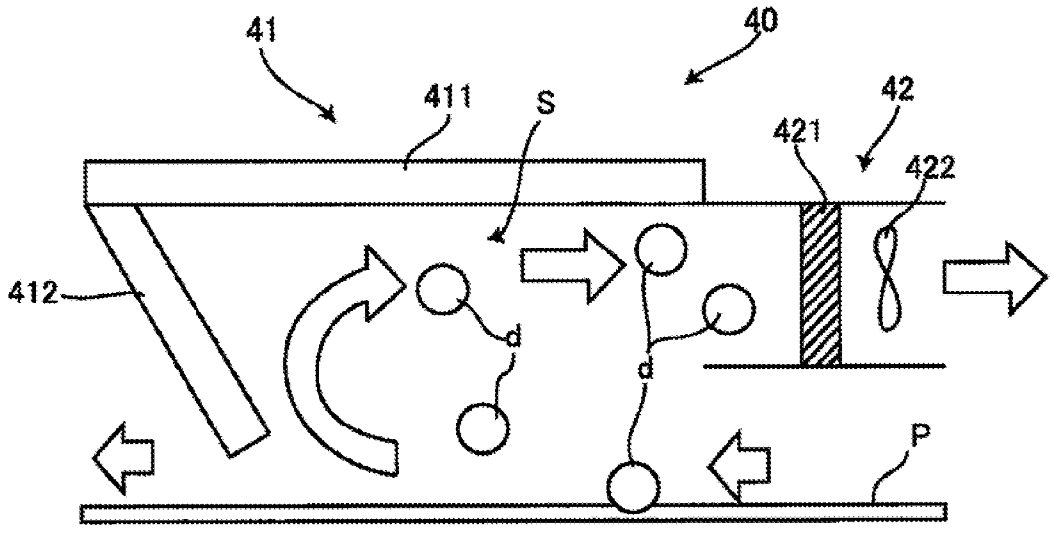
FIG. 9 is a schematic configuration diagram of a paper powder removing device.

FIG. 9 is a schematic configuration view of the paper powder removing device.

The paper powder removing device 40 is provided, with a reflux forming portion 41 and a paper powder collecting portion 42.

Here, the reflux forming portion 41 includes a facing portion 411 and an extending portion 412. The facing portion 411 faces the continuous for paper sheet P by making a space S between the facing portion 411 and the continuous form paper sheet P which is in the middle of transportation. In addition, the extending portion 412 extends from a part of the continuous form paper sheet P of the facing portion 411 on the downstream side in the transporting direction, up to the vicinity of the continuous form paper sheet P, toward the continuous form paper sheet P, in a direction diagonal to the upstream side in the transporting direction. If the extending portion 412 does not come into contact with the continuous form paper sheet P, it is preferable that the extending portion 412 extends to the continuous form paper sheet P as close as possible. Specifically, since the paper powder, which is carried by an air current which accompanies the transportation of the continuous form paper sheet P, is carried by an air space having approximately 6 mm from the continuous form paper sheet P, it is preferable that the extending portion 412 extends to be closer to the continuous form paper sheet P by more than 6 mm. In addition, here, the extending portion 412 diagonally extends facing the upstream side in the transporting direction toward the continuous form paper sheet P, but the extending portion 412 may perpendicularly extend toward the continuous form paper sheet P.

The reflux forming portion 41 has a function of detaching paper powder d which is transported by the air current that accompanies the transportation of the continuous form paper sheet P from the continuous form paper sheet P by the extending portion 412, refluxing the paper powder d by putting the paper powder d into the space S between the continuous form paper sheet P and the facing portion 411, and leading the air current including the paper powder d to the paper powder collecting portion 42.

In addition, the paper powder collecting portion 42 is provided with a dust collecting filter 421 and a fan 422. In a case of the air current which is led to the paper powder collecting portion 42, the paper powder d in the air current is collected by the dust collecting filter 421, and the paper powder d is finally discharged to the outside of the printing apparatus 1 by the fan 422.

Since the paper powder removing device 40 of the embodiment is provided with the reflux forming portion 41 having the above-described configuration, the paper powder is prevented from being confined in the space S by the reflux forming portion 41 and from widely spreading. Therefore, the paper powder is efficiently collected by the paper powder collecting portion 42.

Figure 10:
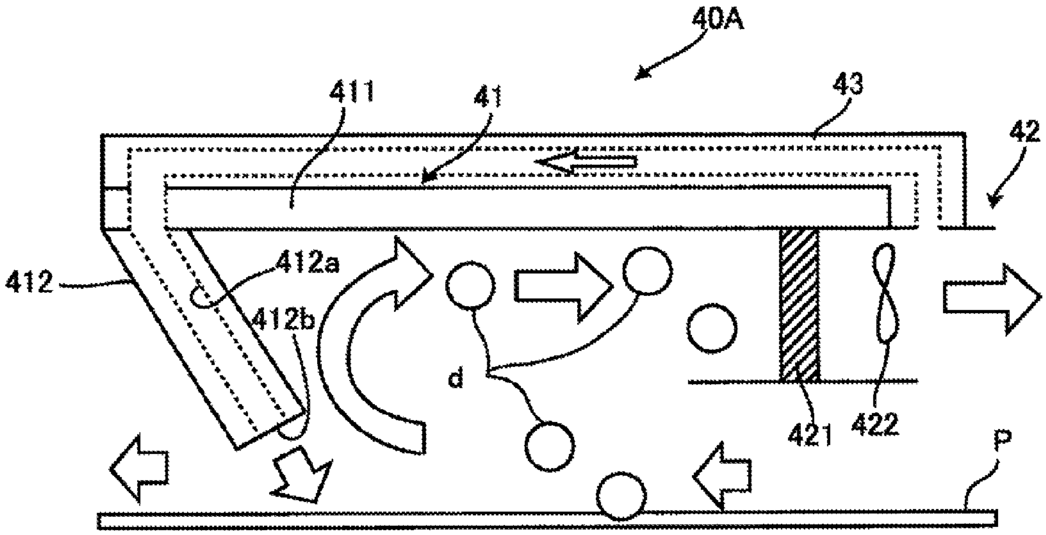
FIG. 10 is a schematic diagram illustrating a first modification example of the paper powder removing device.

FIG. 10 is a schematic view illustrating a first modification example of the paper powder removing device.

In describing the first modification example, and in second and third modification examples which will be described later, constituent elements which are the same as or corresponds to those of the paper powder removing device 40 in FIG. 9 are given the same reference numerals as those in FIG. 9, and differences from the paper powder removing device 40 illustrated in FIG. 9 will be described.

In the extending portion 412 which constitutes the reflux forming portion 41 of a paper powder removing device 40A according to the first modification example illustrated in FIG. 10, a hollow slit 412*a*, which is open at a tip end that is close to the continuous form paper sheet P, is formed. An air flow path 43, which makes the air flow in the hollow slit 412*a* by taking in the air from a port side which blows out the air of the fan 422 provided in the paper powder collecting portion 42, is connected to the hollow slit 412*a*. Accordingly, the air is blown out from an opening 412*b* of the tip end portion on a side which is close to the continuous form paper sheet P in the extending portion 412.

In a case of the first modification example, by blowing out the air, an air curtain is formed between the extending portion 412 and the continuous form paper sheet P, the amount of the paper powder d which passes through the void between the extending portion 412 and the continuous form paper sheet P and flows to the printing machine 60 (refer to FIG. 1) side is reduced, and thus, it is possible to efficiently reflux the paper powder d toward the paper powder collecting portion 42. In other words, in a case of the first modification example, compared to the paper powder removing device 40 illustrated in FIG. 9, the paper powder is more efficiently collected.

Figure 11:
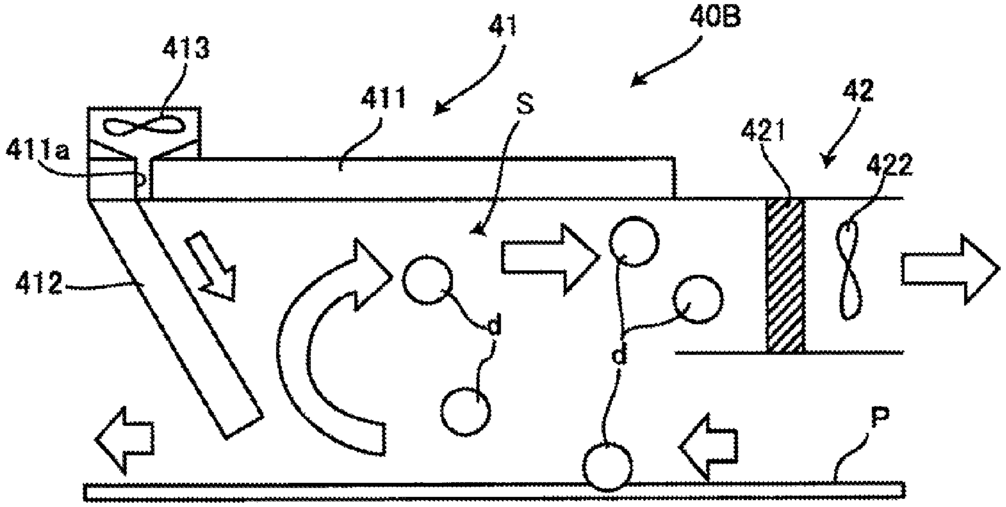
FIG. 11 is a schematic diagram illustrating a second modification example of the paper powder removing device.

FIG. 11 is a schematic view illustrating a second modification example of the paper powder removing device.

In the facing portion 411 which constitutes the reflux forming portion 41 of a paper powder removing device 40B according to the second modification example illustrated in FIG. 11, a slit 411*a* is formed at a location right above the space S side of the extending portion 412, In addition, a fan 413 is provided right above the slit 411*a*. When the fan 413 is operated, the air passes through the slit 411*a*, the air current which flows toward the continuous form paper sheet P along the space S side oldie extending portion 412 is generated, and the air is blown to the continuous form paper sheet P by the air current.

Even in a case of the second modification example, similarly to the case of the first modification example illustrated in FIG. 10, by the air current, the air curtain is formed between the extending portion 412 and the continuous form paper sheet P, the amount of the paper powder d which passes through the void between the extending portion 412 and the continuous form paper sheet P and flows to the printing machine 60 (refer to FIG. 1) side is reduced, and thus, the paper powder d can be efficiently refluxed toward the paper powder collecting portion 42.

Figure 12A:
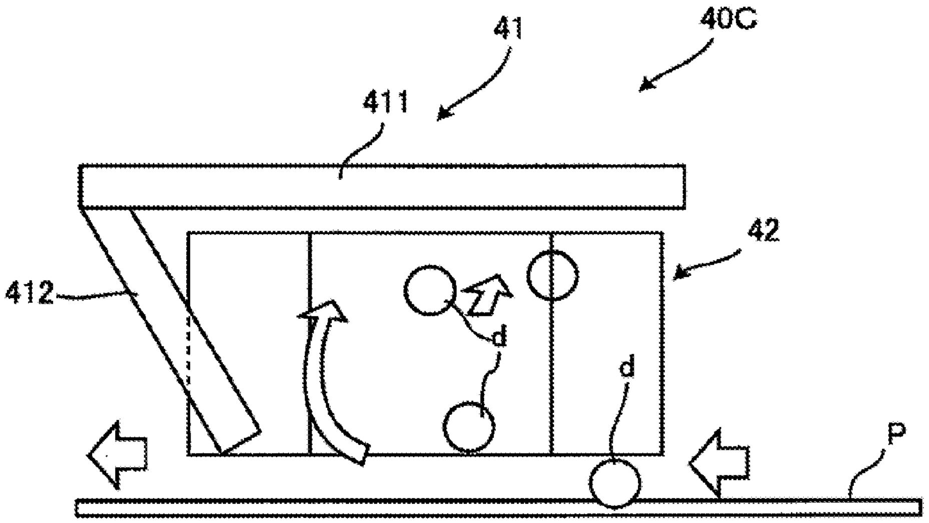
FIGS. 12A and 12B are schematic diagrams illustrating a third modification example of the paper powder removing device.
Figure 12B:
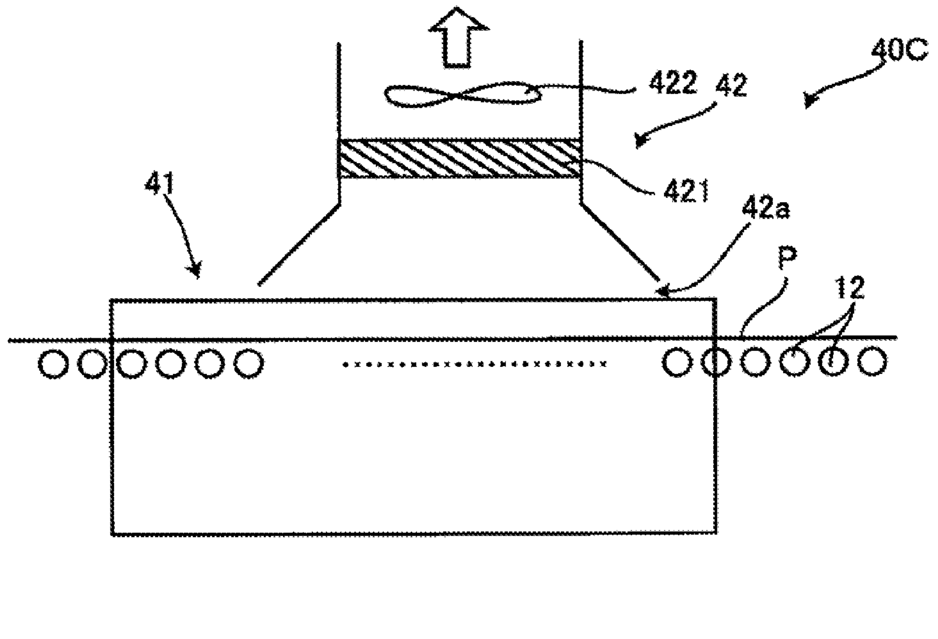

FIGS. 12A and 12B are schematic views illustrating the third modification example of the paper powder removing device. Here, FIG. 12A is a side view when viewed from the same direction as the direction in FIGS. 9 to 11. FIG. 12B is a plan view when the continuous form paper sheet P is viewed down from the above.

The reflux forming portion 41 which constitutes a paper powder removing device 40C according to the third modification example is installed only in a region corresponding to the end portion of the continuous form paper sheet P in the width direction, at which the sprocket holes 12 (refer to FIG. 2 together) are formed. Here, only the paper powder removing device which is installed, in the region corresponding to one end portion of the continuous form paper sheet P is illustrated, but even in the region corresponding the other end portion of the continuous form paper sheet P in the width direction, the paper powder removing device, which is bilaterally symmetrical to the paper powder removing device 40C illustrated here, is installed.

As described above, the projections (not illustrated) of the tractor 30 (refer to FIG. 1) are fitted in the sprocket holes 12, and the continuous form paper sheet P is transported by the projections. For this reason, the paper powder is likely to be generated as the sprocket holes 12 are rubbed by the projections. In addition, even when the continuous form paper sheet P is manufactured, the paper powder is generated when the continuous form paper sheet P is cut or the sprocket holes 12 are punched, and gets into the storage box 11 together with the continuous form paper sheet P.

The paper powder removing device 40C according to the third modification example illustrated in FIGS. 12A and 12B is a device which aims the end portion in the width direction of the continuous form paper sheet P provided with the sprocket holes 12, and intensively collects the paper powder at the end portion part.

In addition, the paper powder collecting portion 42 of the paper powder removing device 40C according to the third modification example is installed on an outer side of the continuous form paper sheet P in the width direction and an inlet port 42*a* which sucks in the air faces the continuous form paper sheet P. In the case of the third modification example, by the fan 422, the air current is actively sucked in from the inlet port 42*a*, facing the inlet port 42*a* side of the paper powder collecting portion 42. The fan 422 according to the third modification example is an example of an intake portion.

In the third modification example, since the paper powder collecting portion 42 is installed at a position which is shifted from the continuous form paper sheet P in the width direction, the paper powder which remains in the vicinity of the inlet port 42*a* is prevented from being carelessly dropped onto the continuous form paper sheet P and from causing an image defect.

In addition, in the third modification example illustrated in FIGS. 12A and 12B, the reflux forming portion 41 is installed only in the region corresponding to the end portion of the continuous form paper sheet P in the width direction. However, by providing the reflux forming portion 41 across the entire region in the width direction, as illustrated in FIGS. 12A and 12B, the paper powder collecting portion 42 may be installed, at a position which is shifted from the continuous form paper sheet P in the width direction.

(Printing Machine Maintenance Device)

Next, the printing machine maintenance device 50 illustrated in FIG. 1 will be described.

The printing machine 60 is the so-called ink jet type printing machine which prints the image on the continuous form paper sheet P by ejecting the ink from the ejection ports 61*a*.

The printing machine 60 in the embodiment is a printing machine, in which the plural nozzles 61 are aligned linearly in the width direction (a direction which is perpendicular to a paper surface in FIG. 1) of the continuous form paper sheet P, and which prints the image by the plural nozzles 61.

Here, when the printing is paused, in order to maintain moisture, a cap covers the ejection port 61*a*. In addition, in the ejection port 61*a*, since the ink is attached and wet, there is a concern that a dust, such as the paper powder, is likely to be attached and a quality of printing deteriorates when the dust is attached. For this reason, it is necessary to make the ejection ports 61*a* always clean by wiping off the ejection ports 61*a* of the nozzles 61 at times.

The printing machine maintenance device 50 in the embodiment is an example of a maintenance device. The printing machine maintenance device 50 has both functions of covering the ejection ports 61*a* of the nozzles 61 and wiping off the ejection ports 61*a*.

When printing is paused, the printing machine 60 is raised in the arrow U direction illustrated in FIG. 1, and is maintained at the stand-by position. When printing is started, the printing machine 60 descends down to the printing position opposing to the continuous form paper sheet P in the arrow D direction illustrated in FIG. 1. The printing machine 60 which is at the printing position is illustrated in FIG. 1.

The printing machine maintenance device 50 freely reciprocates in an arrow A-B direction illustrated in FIG. 1, and when the printing machine 60 is at the printing position, the printing machine maintenance device 50 is at the retreating position illustrated in FIG. 1 which is retreated in the arrow B direction. Then, the printing machine maintenance device 50 performs operations of moving forward in the arrow A direction when printing is paused and the printing machine 60 is raised in the arrow U direction, going below the printing machine 60, and wiping off and covering the nozzles 61 with the cap. Then, the printing machine maintenance device 50 moves in the arrow B direction before printing is started and retreats to the retreating position, and the printing machine 60 descends down to the printing position in the arrow D direction.

Figure 13:
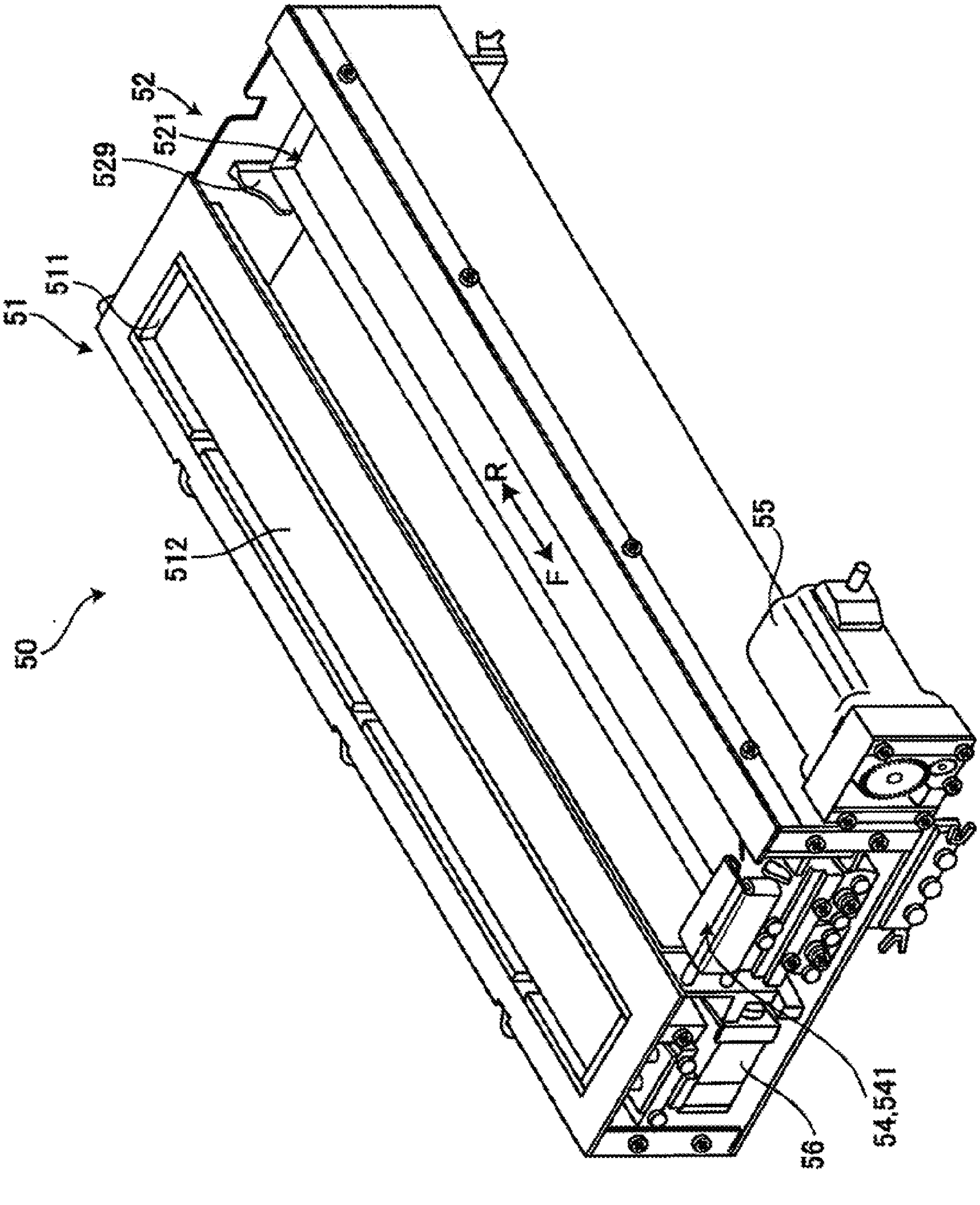
FIG. 13 is a perspective view of a printing machine maintenance device according to the embodiment.
Figure 14:
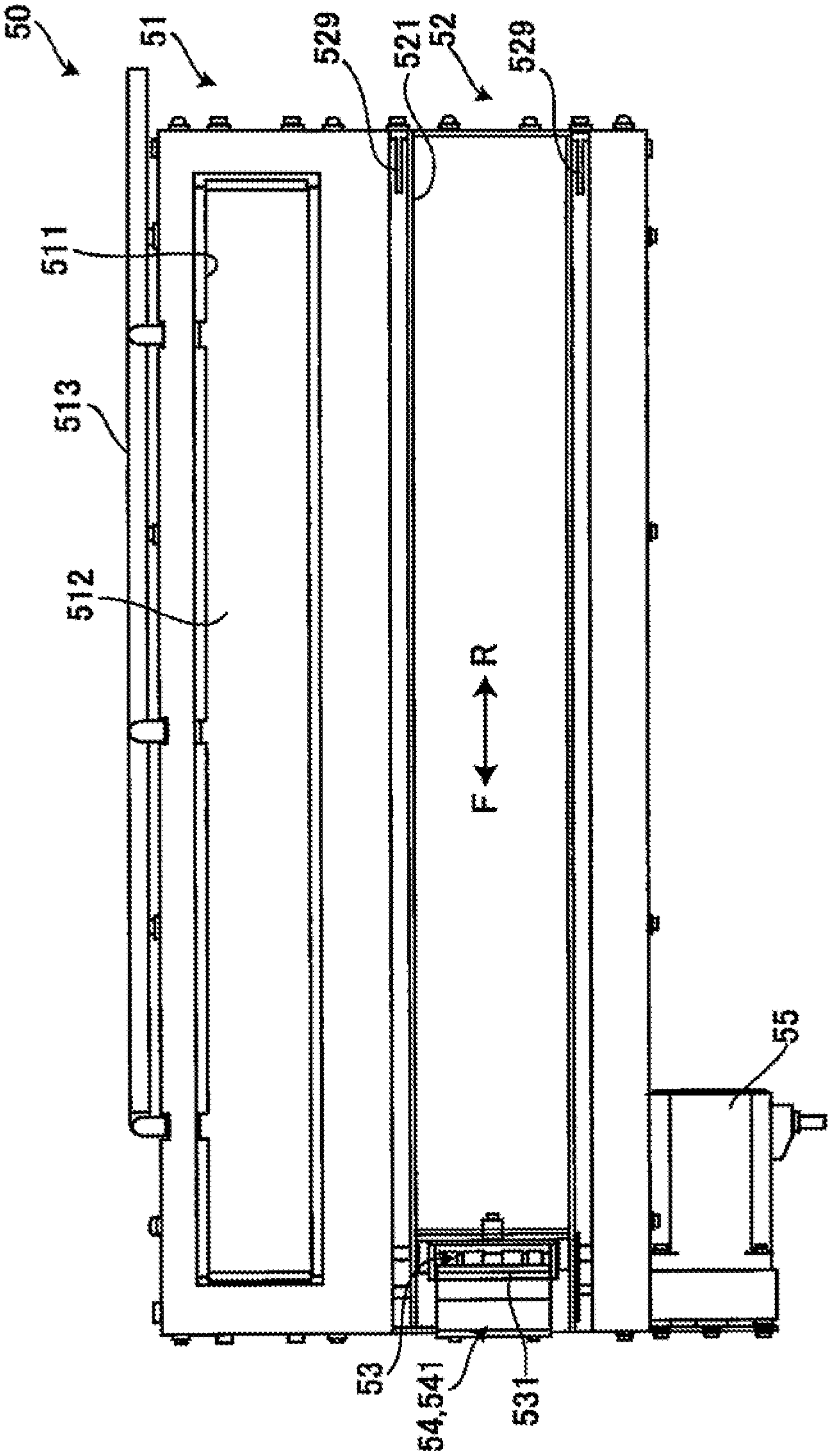
FIG. 14 is a plan view of the printing machine maintenance device according to the embodiment.
Figure 15:
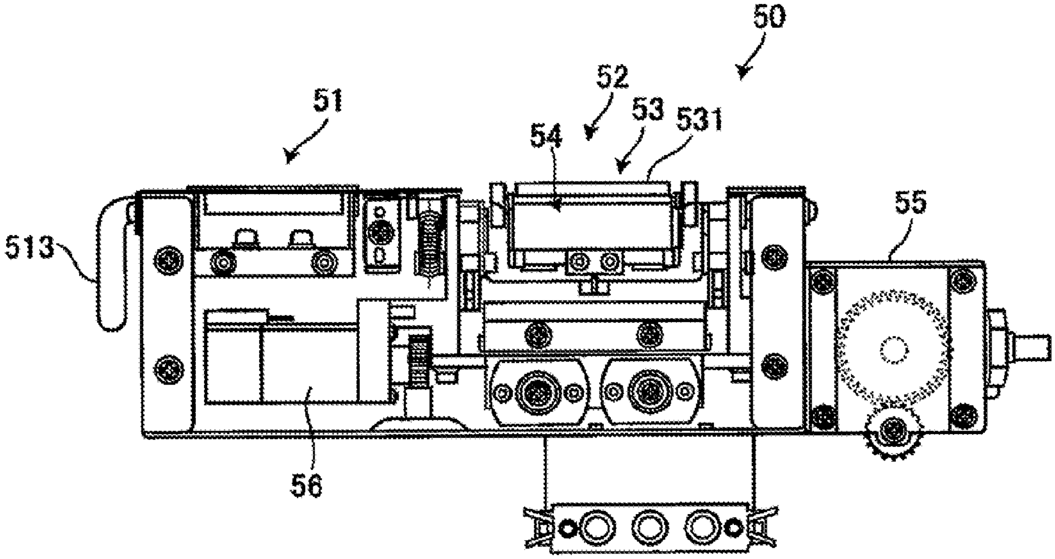
FIG. 15 is a front view of the printing machine maintenance device according to the embodiment.

FIGS. 13 to 15 are respectively a perspective view, a plan view, and a front view of the printing machine maintenance device according to the embodiment.

The printing machine maintenance device 50 includes a covering portion 51 which operates as the cap of the nozzles 61, and a cleaning portion 52 which cleans the nozzles 61 by wiping off the nozzles 61.

In the covering portion 51, a recess portion 511 which extends in the width direction (a direction which is perpendicular to the paper surface in FIG. 1) of the continuous form paper sheet P is formed, and a sponge 512 containing moisture is disposed in the recess portion 511. As the printing machine 60 descends and the nozzles 61 get into the recess portion 511, the nozzles 61 becomes in a state of being covered by the cap. A waste liquid exhaust pipe 513 extends next to the recess portion 511. There is a case where the ink is ejected into the recess portion 511 from the ejection ports 61*a* of the nozzles 61 so that the ink in the nozzles 61 is not hardened. The water contained M the sponge 512 or the ejected ink is collected through the waste liquid exhaust pipe 513. Replenishment of the water to the sponge 512 is performed by a water supplying device, which is not illustrated, when the printing machine maintenance device 50 is at the retreating position illustrated in FIG. 1.

Even in the cleaning portion 52, a long groove 521 which extends in the width direction of the continuous form paper sheet P is provided. In the cleaning portion 52, a wiping device 53 which wipes off the ejection ports 61*a* (refer to FIG. 1) of the nozzles 61 is provided. The wiping device 53 moves in an arrow F-R direction illustrated in FIGS. 13 and 14, along the long groove 521 of the covering portion 51.

When cleaning the ejection ports 61*a* of the nozzles 61, the printing machine maintenance device 50 is moved and paused so that the nozzles 61 are disposed right above the long groove 521. Then, the wiping device 53 is moved along the long groove 521. In this case, a wiping member 531 which is provided in the wiping device 53 wipes off the ejection ports 61*a* of the nozzles 61.

A wiping member wiping portion 54 is provided in an end portion on a left side of the long groove 521 in FIG. 14. In the wiping member wiping portion 54, a cleaning member 541, which wipes off impurities of the wiping member 531 provided in the wiping device 53, is provided. In FIG. 13, the wiping device 53 is in a state of being almost hidden under the cleaning member 541, and is not illustrated. Meanwhile, in FIG. 14, the wiping device 53 is at a position to which the wiping device 53 slightly moves in the arrow R direction from a state of being hidden under the cleaning member 541, and the wiping device 53 appears in FIG. 14. The wiping device 53 will be described in detail later.

In addition, in the printing machine maintenance device 50, two motors 55 and 56 are provided. One motor 55 is a motor which moves the printing machine maintenance device 50 in the arrow A-B direction illustrated in FIG. 1. In addition, the other motor 56 is a motor which is provided in the wiping device 53, and moves the wiping device 53 in the arrow F-R direction along the long groove 521.

In the printing machine maintenance device 50, a relative height of the covering portion 51 and the cleaning portion 52 is a problem. Since the wiping member 531 which is provided in the wiping device 53 that is a constituent element of the cleaning portion 52 wipes off the ejection ports 61*a* on lower ends of the nozzles 61, as illustrated in FIG. 15, the wiping member 531 is at a position which is slightly higher than other members. In contrast, in a state where the covering portion 51 of the printing machine maintenance device 50 is positioned right below the nozzles 61 of the printing machine 60, the printing machine 60 has a size of a portion overlapped with an upper part of the cleaning portion 52. For this reason, when the ejection ports 61*a* of the nozzles 61 descend down to a prescribed height which is sufficiently covered by the covering portion 51, in this state, the printing machine 60 hits the wiping member 531 during descending.

Meanwhile, when the wiping member 531 is installed at a position lower than the covering portion 51, the covering portion 51 can sufficiently cover the ejection ports 61*a* of the nozzles 61. However, in this case, the covering portion 51 becomes an obstacle, and thus, the wiping member 531 hits the ejection ports 61*a* of the nozzles 61 and wiping cannot be sufficiently performed.

In order to solve this problem, it is considered that the wiping device 53 or the wiping member 531 is vertically moved by the motor. However, in this case, it is required that the motor is additionally provided, and further, a mechanism which vertically moves the wiping device 53 or the wiping member 531 is provided, and accordingly, a more complicated configuration, a larger size, and a higher cost, are inevitable.

In contrast, in the embodiment, as described below, the height of the wiping member 531 is changed.

Figure 16:
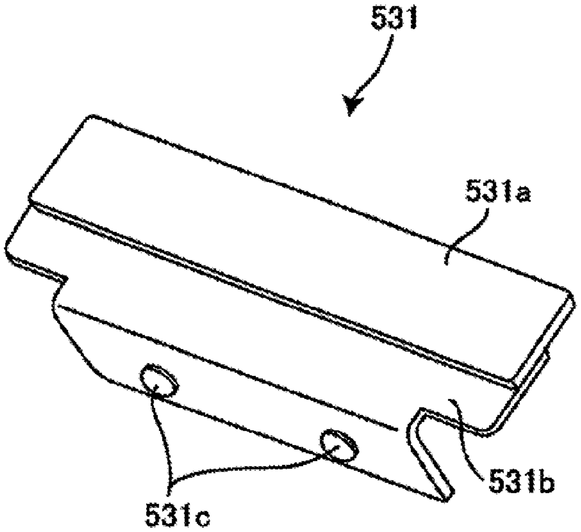
FIG. 16 is a perspective view of a wiping member which constitutes a wiping device.

FIG. 16 is a perspective view of the wiping member which constitutes the wiping device.

The wiping member 531 has a configuration in which a wiping blade 531*a* is supported by a supporting member 531*b*. In the supporting member 531*b*, projections 531*c* for positioning are provided. The wiping device 53 wipes the ejection ports 61*a* (refer to FIG. 1) of the nozzles 61 which are aligned linearly by rubbing the ejection ports 61*a* by the wiping blade 531*a*.

Figure 17:
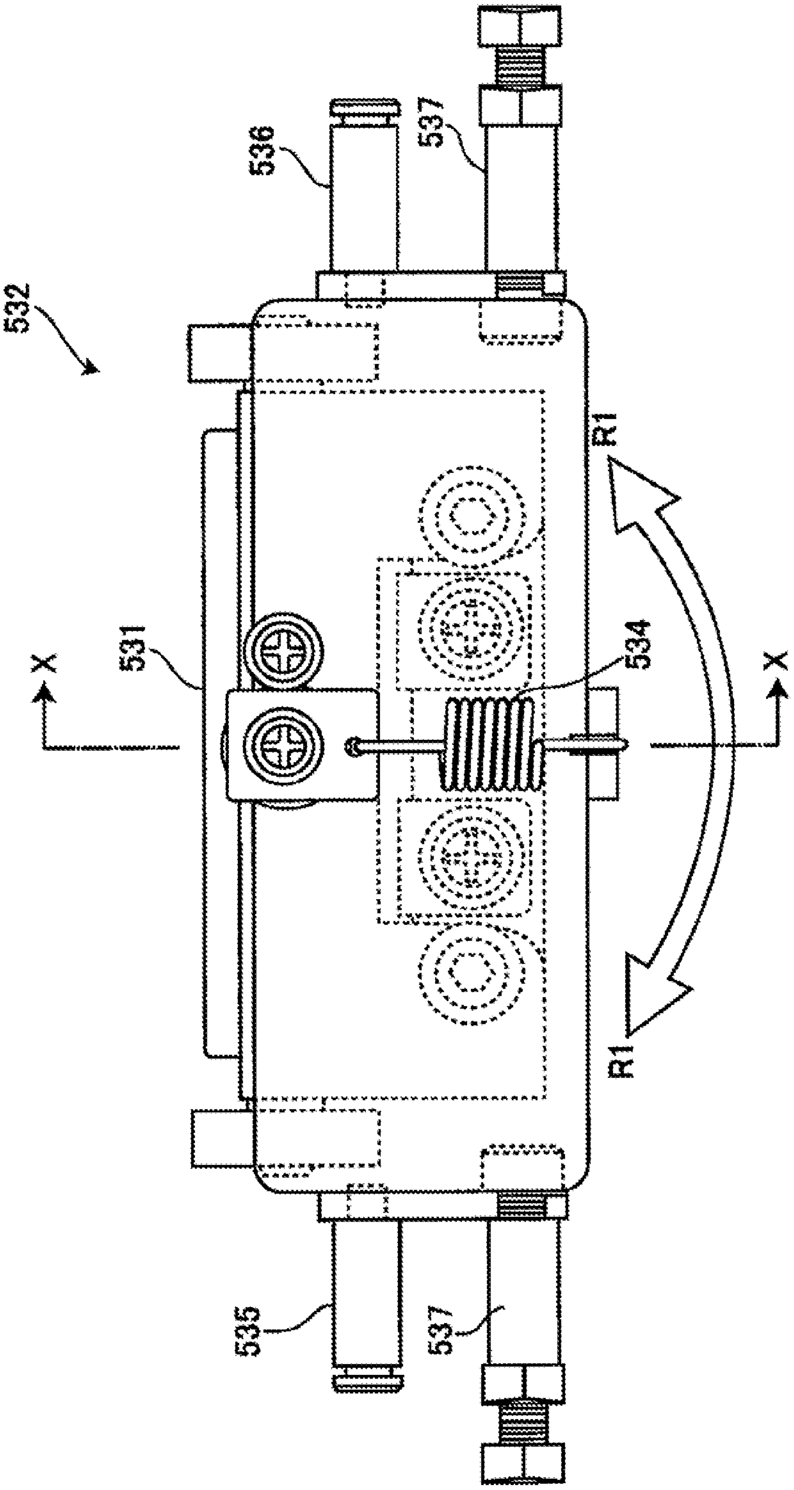
FIG. 17 is a right side view of a wiping member assembly which incorporates a wiping member therein.
Figure 18:
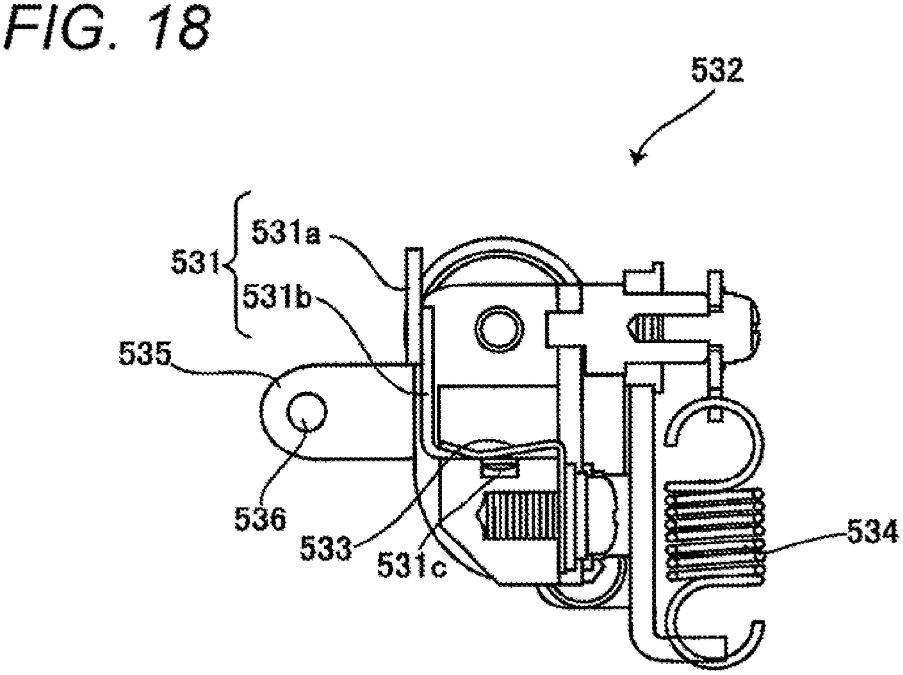
FIG. 18 is as cross-sectional view of the wiping member assembly which incorporates the wiping member therein, along an arrow X-X illustrated in FIG. 17.

FIGS. 17 and 18 are respectively a right side view and a cross-sectional view along the arrow X-X illustrated in FIG. 17, of a wiping member assembly which incorporates a wiping member therein.

As illustrated in FIG. 18, the wiping member 531 illustrated in FIG. 16 is fixed to a wiping member assembly 532, as the wiping member 531 is positioned by the projections 531*c* of the supporting member 531*b* and is pushed by a leaf spring, 533. The wiping member 531 is a consumable, and is necessary to be exchanged. Here, by avoiding a fixing method, such as screwing, the wiping member 531 which is a consumable is easily exchanged.

In addition, the center of the wiping member assembly 532 in the longitudinal direction is supported to be freely and slightly rotated in an arrow R1-R1 direction illustrated in FIG. 17, and the wiping member assembly 532 is pulled by a coil spring 534. If the wiping member 531 is inclined, the coil spring 534 extends, and a force that returns the posture to no inclination is exerted. It is required that the wiping member 531 is allocated in the ejection ports 61*a* (refer to FIG. 1) of the nozzles 61. For this reason, here, it is devised to reliably allocate the wiping member 531 in the ejection ports 61*a* of the nozzles 61 by increasing a tolerance limit, such as an attachment error between the nozzles 61 and the wiping device 53.

As illustrated in FIG. 18, the wiping member assembly 532 includes an arm 535 to which an arm 536 (refer to FIG. 17 together) is fixed. The arm 536 which is fixed to the arm 535 is a center of rotation with respect to a supporting member 538 when the wiping member assembly 532 is attached to the supporting member 538 which will be described later.

The wiping member assembly 532 is protruded in the longitudinal direction as illustrated in FIG. 17, and includes two arms 536 and 537 on a right side and on a left side, respectively.

Figure 19:
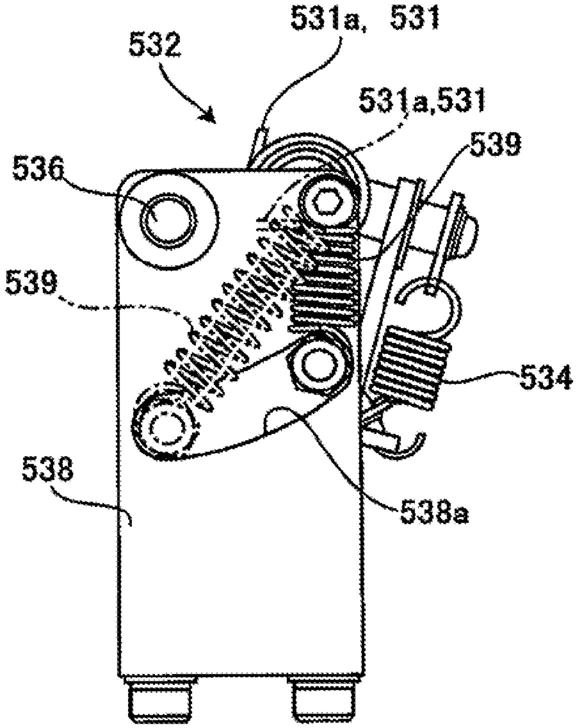
FIG. 19 is a front view of a state where the wiping member assembly illustrated in FIGS. 17 and 18 is supported by a supporting member.
Figure 20:
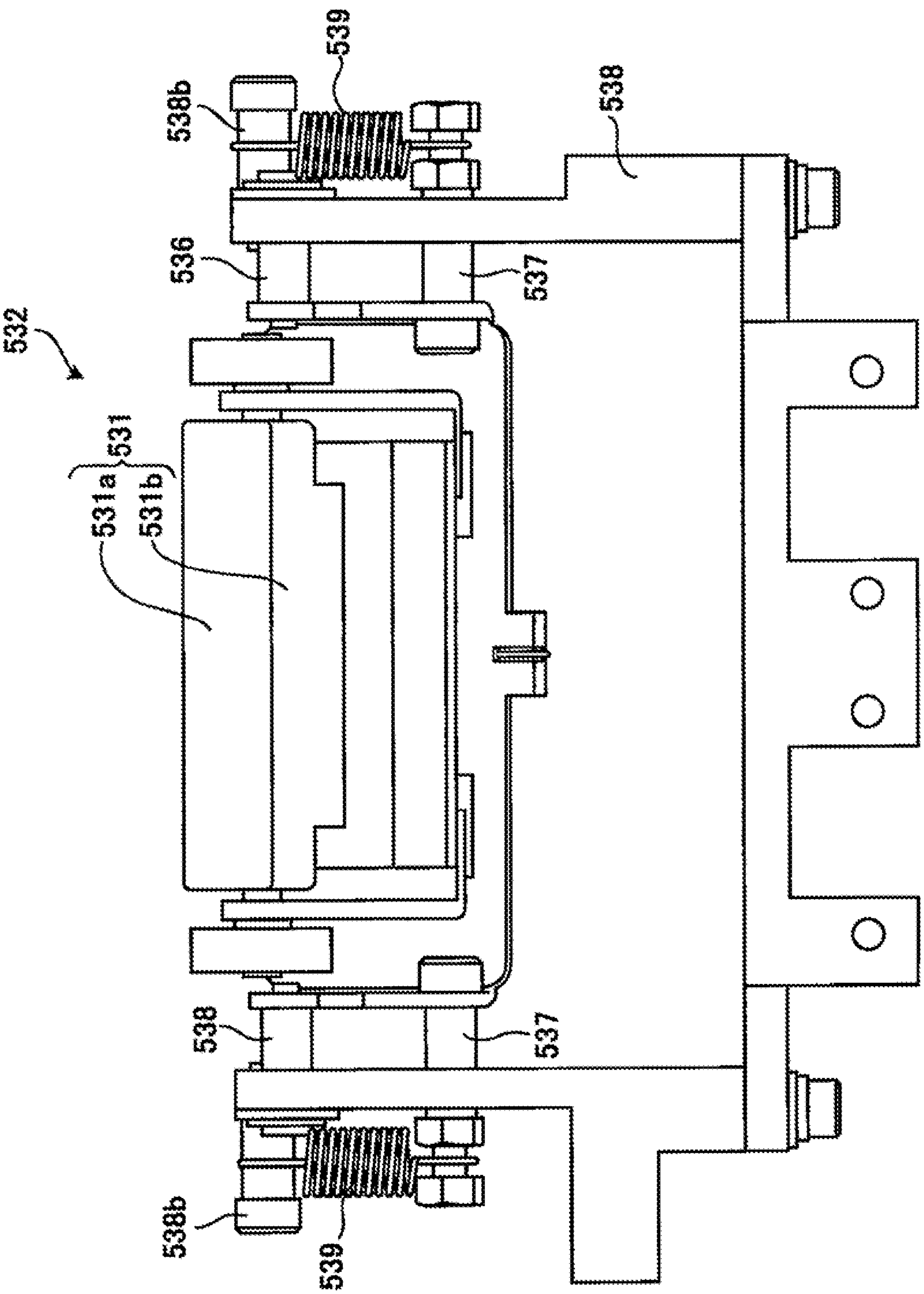
FIG. 20 is a left side view of a state where the wiping member assembly illustrated in FIGS. 17 and 18 is supported by the supporting member.

FIGS. 19 and 20 are respectively a front view and a left side view in a state where the wiping member assembly illustrated in FIGS. 17 and 18 is supported by the supporting member.

As illustrated in FIG. 20, one arm 536 among the respective two arms 536 and 537 (refer to FIG. 17 together) which are provided on both right and left sides of the wiping member assembly 532 is supported by the supporting member 53 to be freely rotated, and the other arm 537 penetrates a long hole 538*a* (refer to FIG. 19) of the supporting member 538. On both right and left sides of the supporting member 538, a protruded arm 538*b* is provided, and a coil spring 539 is laid between the arm 538*b* and the arm 537 of the wiping member assembly 532 which penetrates the long hole 538*a*.

As illustrated in FIG. 19, the wiping member assembly 532 is supported in a slightly inclined posture with respect to the supporting member 538, and further is rotatable around the arm 536 from the supported posture. In FIG. 19, a posture before rotation of the wiping member assembly 532 is illustrated by a solid line, and a tip end part of the wiping member 531 (wiping blade 531*a*) in a rotated posture and the coil spring 539 in an extended state, are illustrated by dashed lines.

Figure 21:
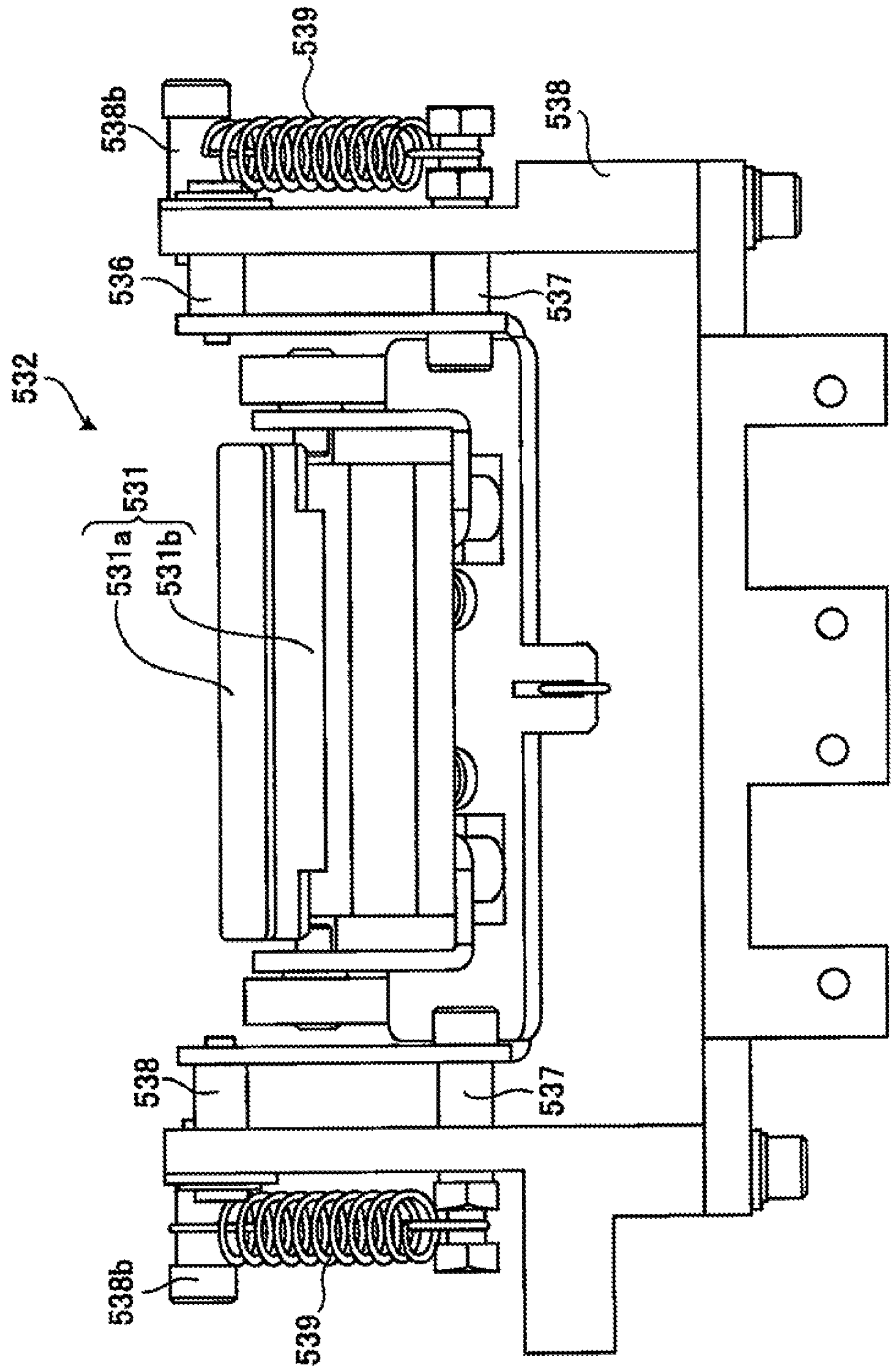
FIG. 21 is a left side view illustrating a posture of the wiping member assembly after being rotated.

FIG. 21 is a left side view illustrating a posture of the wiping member assembly after being rotated.

In contrast, FIG. 20 illustrated above is a left side view of the wiping member assembly in a posture before the rotation.

As can be known from FIGS. 20 and 21, when the wiping member assembly 532 rotates, the wiping member 531 which is incorporated in the wiping member assembly 532 also rotates. However, the wiping member 531 has a structure in which the height is lowered while rotating. In other words, before the wiping member assembly 532 which includes the wiping member 531 rotates, the wiping blade 531*a* of the wiping member 531 is at a position higher than the covering portion 51 (refer to FIGS. 13 to 15), and after the rotation, the height of the wiping blade 531*a* is lowered to a position lower than the covering portion 51. In other words, the wiping member 531 wipes the ejection ports 61*a* of the nozzles 61 while rubbing the ejection ports 61*a* when the wiping member 531 is at a high position before the rotation, and in a state of being rotated, the height of the wiping member 531 is lowered down to a position where the wiping member 531 does not interfere with the covering portion 51 so as to cover the ejection ports 61*a* of the nozzles 61. When a force in a rotating direction is applied, the wiping member assembly 532 becomes in a second posture after the rotation, and when the force is released, the wiping member assembly 532 returns to a first posture before the rotation by the operation of the coil spring 539.

The wiping member assembly 532 which is supported by the supporting member 538 moves in the arrow FR direction illustrated in FIGS. 13 and 14, by the rotation of the motor 56 illustrated in FIGS. 13 and 15.

Figure 22:
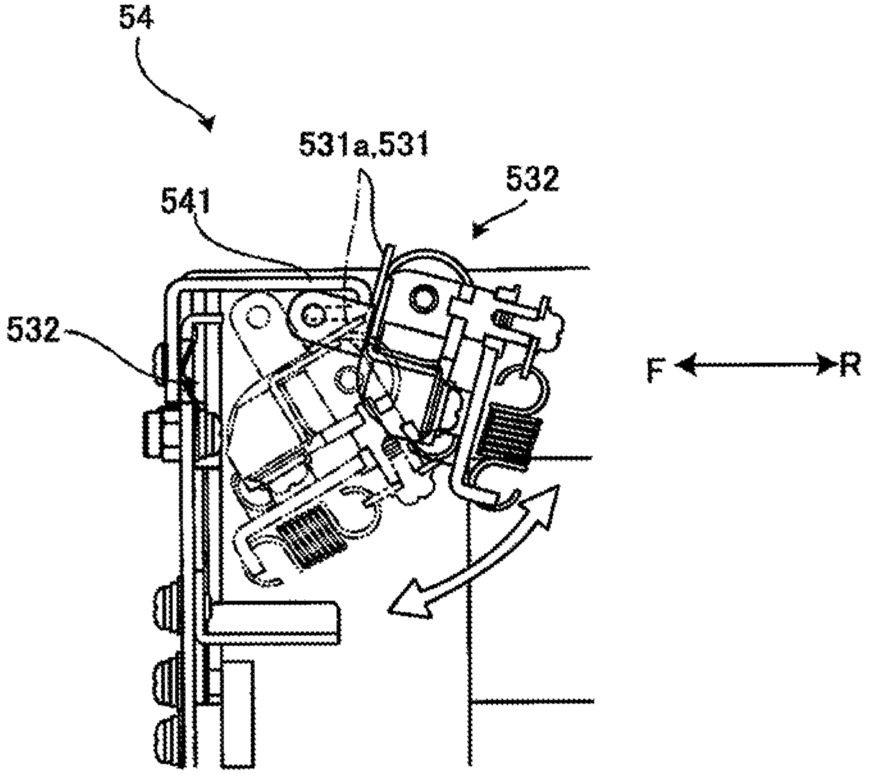
FIG. 22 is a view illustrating operations of the wiping member assembly which is close to a wiping member wiping portion.

FIG. 22 is a view illustrating operations of the wiping member assembly which is close to the wiping member wiping portion.

Figure 23:
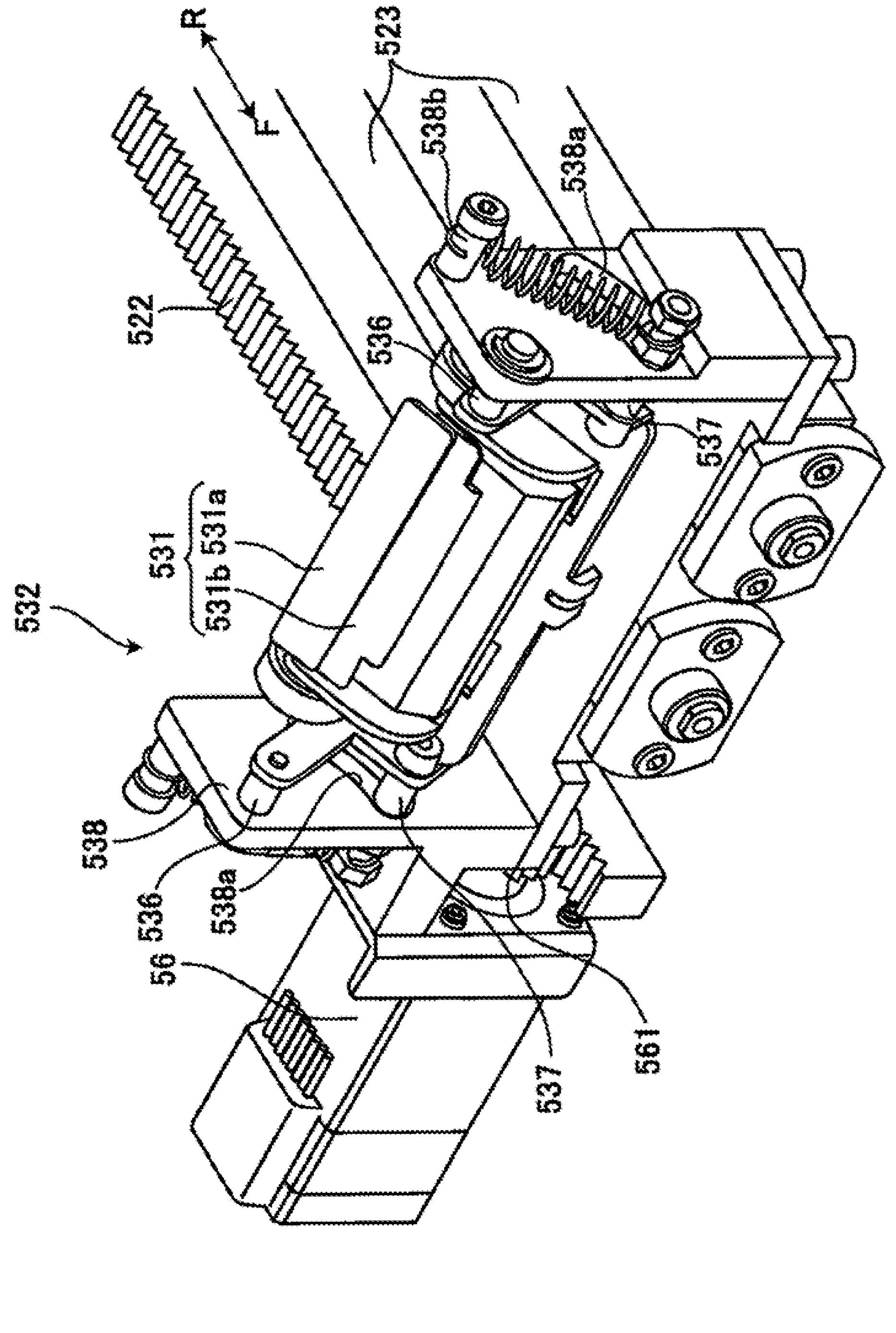
FIG. 23 is a perspective view illustrating the wiping member assembly when the wiping member assembly moves up to the wiping member wiping portion.

In addition, FIG. 23 is a perspective view illustrating the wiping member assembly when the wiping member assembly moves up to the wiping member wiping portion.

In the wiping member wiping portion 54 (refer to FIGS. 13 and 14 together), the cleaning member 541 with a blade, which cleans the wiping blade 531*a* by wiping off the wiping, blade 531*a* of the wiping member 531 illustrated in FIG. 16, is provided.

In FIG. 22, the wiping member assemblies 532 are illustrated by both a solid line and a clashed line. The wiping member assembly 532 illustrated by the solid line illustrates a state right after the wiping member assembly 532 moves in an arrow F direction (refer to FIGS. 13 and 14 together), and comes into contact with the cleaning member 541. In addition, the wiping member assembly 532 illustrated by the dashed line illustrates a state where the wiping member assembly 532 further moves in the arrow F direction, and the wiping member assembly 532 is rotated by being pushed to the cleaning member 541.

In FIG. 23, the wiping member wiping assembly, which is illustrated by the dashed line in FIG. 22 and is in the second posture after the rotation, is illustrated. However, in FIG. 23, the cleaning member 541 illustrated in FIG. 22 is omitted so that the posture of the wiping member assembly 532 after the rotation appears.

In the cleaning portion 52 illustrated in FIGS. 13 and 14, a rack 522 and a guiding bar 523, which extend along the long groove 521 and are illustrated in FIG. 23, are provided, in a rotation axis of the motor 56 illustrated in FIG. 13, a pinion gear 561, which is engaged with the rack 522, is provided. In addition, a frame body of the motor 56 is fixed to the supporting member 538. For this reason, the wiping member assembly 532 moves together with the motor 56 in an arrow R-F direction in accordance with the rotation of the motor 56.

When the wiping member assembly 532 moves in the arrow R direction and is apart from the cleaning member 541, the wiping member assembly 532 which is pushed to the cleaning member 541 as illustrated by the dashed line in FIG. 22 and is in an inclined posture returns to the raised first posture before the rotation and advances along the long groove 521. When the wiping member assembly 532 advances up to the tip most end in the arrow R direction, at this time, the arm 537 of the wiping member assembly 532 butts against a butting member 529 (refer to FIG. 13) which is provided at the end portion of the long groove 521 in the arrow R direction, and again, the wiping member assembly 532 is in the inclined second posture. In this manner, the wiping member assembly 532 in the embodiment rotates and is in the inclined second posture even on any one of a front side provided with the wiping member wiping portion 54 and a rear side provided with the butting member 529. Therefore, when the wiping member assembly 532 moves to any one of the front side and the rear side, by the covering portion 51, the height of the wiping member assembly 532, at which the operation of covering the ejection ports 61*a* of the nozzles 61 is not interrupted, is achieved. However, in the embodiment, by employing the operation sequence illustrated hereinafter, the rear side provided with the butting member 529 is considered as an initial position of the wiping member assembly 532.

When wiping off the ejection ports 61*a* of the nozzles 61, first, the printing machine maintenance device 50 is moved so that the covering portion 51 is positioned right below the nozzles 61, and the ink is ejected from the ejection ports 61*a* so that ink droplets can be made in the ejection ports 61*a* of the nozzles 61. This is for removing the dust even when the dust, such as the paper powder gets into the nozzles 61 from the ejection ports 61*a* of the nozzles 61. In addition, the covering portion 51 is disposed right below the nozzles 61 in preparing for a case where the ink is dropped.

After this, the printing machine maintenance device 50 is moved so that the cleaning portion 52 is positioned right below the nozzles 61. Then, the wiping member assembly 532 which is at the initial position is moved toward the front side (arrow F direction). The wiping member assembly 532 which is at the initial position butts against the butting member 529 and has the inclined, second posture. However, when the wiping member assembly 532 starts to move toward the front side and is apart from the butting member 529, the wiping member assembly 532 is in the raised first posture. In the raised first posture, the wiping blade 531*a* of the wiping member 531 wipes off the ejection ports 61*a* of the nozzles 61 which are aligned linearly. When wiping is over, and the wiping member assembly 532 reaches the front side, by the cleaning member 541 which is provided on the front side, the wiping blade 531*a* of the wiping, member 531 is wiped off. After this, the wiping member assembly 532 returns to the initial position on the rear side, butts against the butting member 529, and waits in the inclined second posture. Furthermore, after this, the priming machine maintenance device 50 is moved so that the covering portion 51 is right below the nozzles 61, the printing machine 60 descends, and the ejection ports 61*a* of the nozzles 61 are covered with the covering portion 51. Accordingly, the printing machine 60 is in a waiting state where the ejection ports 61*a* of the nozzles 61 are covered with the covering portion 51 in a state of being cleaned by wiping, and the moisture is maintained.

In addition, here, the rear side is considered as the initial position of the wiping member assembly 532. However, even on the front side, since the wiping member assembly 532 butts against the cleaning member 541 provided in the wiping member wiping portion 54 and is in the inclined second posture, the front side may be set as the initial position of the wiping member assembly 532.

In this manner, in the embodiment, the height of the wiping member 531 is a height at which the wiping member assembly 532 wipes off the ejection ports 61*a* of the nozzles 61 in the raised first posture, and a height at which the wiping member 531 does not interfere with the covering portion 51 so as to cover the ejection ports 61*a* of the nozzles 61 in the inclined second posture when the wiping member 531 is moved to the front side or the rear side. Therefore, in the embodiment, a mechanism which vertically moves the wiping device 53 or the wiping member 531 by the motor is not necessary, and a simple configuration and a low cost can be achieved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing apparatus comprising:

a first driving portion that transports a paper sheet by driving;

a printing portion that is disposed on an upstream side of the first driving portion in a transporting direction of the paper sheet which is transported by the first driving portion, includes a plurality of aligned ejection ports ejecting liquid onto the transporting paper sheet to print an image on the paper sheet by the liquid;

a drawing portion that is disposed on an upstream side of the printing portion in the transporting direction, draws the paper sheet of which a tip end is placed at a preset position, and feeds the paper sheet to a transporting path via the printing portion and the first driving portion; and a guiding portion that is arranged between the printing portion and the first driving portion in the transporting direction; and a second driving portion that drives the guiding portion and moves the guiding portion, wherein:

when feeding the paper sheet, the guiding portion reciprocates between a first position and a second position which is apart from the first position in a first direction in accordance with the driven by second driving portion, the guide portion guides a part passing through the printing portion in the paper sheet to the first driving portion in a state where the guide portion is in the first position, and the guide portion makes the part passing through the printing portion in the paper sheet detour in the first direction and guides the part to the first driving portion in a state where the guide portion moves to the second position.

2. The printing apparatus according to claim 1, wherein the guiding portion includes a first guiding portion and a second guiding portion, the first guiding portion and the second guiding portion move as one body in moving between the first position and the second position, the second guiding portion is separated from the first guiding portion and freely moves between the second position and a third position which is apart from the second position in a second direction that intersects the first direction, and the guiding portion makes the part that passes through the printing portion in the paper sheet detour in the first direction by the first guiding portion in a state where the second guiding portion moves to the third position, and further, makes the part detour in the second direction by the second guiding portion and guides the part to the first driving portion.

3. The printing apparatus according to claim 1, further comprising:

a control portion that performs a first control which the allows the first driving portion to transport the paper sheet at a relatively lowered transporting speed and moves the guiding portion by the second driving portion from the first position to a printing position after the paper sheet is fed, allows the printing portion to perform printing on the paper sheet at a speed in accordance with the relatively lowered transporting speed, allows the first driving portion to transport the paper sheet at a relatively raised transporting speed after the guiding portion moves to the printing portion, and allows the printing portion to perform printing on the paper sheet at a speed in accordance with the relatively raised transporting speed.

4. The printing apparatus according to claim 3, wherein, in addition to performing the first control, being free to be switched with the first control, the control portion performs a second control which allows the second driving portion to move the guiding portion to the printing position before printing is started by the printing portion after the paper sheet is fed, and allows the printing portion to start printing on the paper sheet transported by driving the first driving portion after the guiding portion moves to the printing position.

* * * * *